(12) United States Patent
Bird

(10) Patent No.: US 11,879,516 B2
(45) Date of Patent: Jan. 23, 2024

(54) VARIABLE STIFFNESS MAGNETIC SPRING

(71) Applicant: Portland State University, Portland, OR (US)

(72) Inventor: Jonathan Bird, Portland, OR (US)

(73) Assignee: Portland State University, Portland, OR (US)

(*) Notice: Subject to any disclaimer, the term of this patent is extended or adjusted under 35 U.S.C. 154(b) by 465 days.

(21) Appl. No.: 16/996,790

(22) Filed: Aug. 18, 2020

(65) Prior Publication Data

US 2021/0054897 A1 Feb. 25, 2021

Related U.S. Application Data

(60) Provisional application No. 62/888,992, filed on Aug. 19, 2019.

(51) Int. Cl.
*F16F 6/00* (2006.01)

(52) U.S. Cl.
CPC .......... *F16F 6/005* (2013.01); *F16F 2222/06* (2013.01); *F16F 2228/066* (2013.01)

(58) Field of Classification Search
CPC ... F16F 6/005; F16F 2222/06; F16F 2228/066
USPC .............................................. 188/267, 267.1
See application file for complete search history.

(56) References Cited

U.S. PATENT DOCUMENTS

| | | | | |
|---|---|---|---|---|
| 5,584,367 A | * | 12/1996 | Berdut | B60L 13/10 104/294 |
| 5,896,961 A | * | 4/1999 | Aida | F16F 15/03 188/267 |
| 8,550,221 B2 | * | 10/2013 | Paulides | F16F 6/00 267/136 |
| 9,016,446 B2 | * | 4/2015 | Mankame | F16F 6/00 188/267 |
| 2012/0193179 A1 | * | 8/2012 | Gysen | H02K 41/031 188/267 |
| 2012/0279345 A1 | * | 11/2012 | Bergander | F16F 9/535 188/267.2 |
| 2023/0151868 A1 | * | 5/2023 | Bird | F16F 6/005 267/140.15 |

FOREIGN PATENT DOCUMENTS

| | | | | |
|---|---|---|---|---|
| JP | 2014095429 A | * | 5/2014 | ............... F16F 6/00 |
| WO | WO-2019201907 A1 | * | 10/2019 | ............... F16F 15/03 |

\* cited by examiner

*Primary Examiner* — Christopher P Schwartz
(74) *Attorney, Agent, or Firm* — Klarquist Sparkman, LLP

(57) ABSTRACT

This disclosure presents a new type of variable stiffness magnetic spring, which can have a highly linear translational force characteristic. The variable stiffness is achieved through the rotation of a central magnet. Both positive and negative spring constants can be created. Using an analytic-based field analysis modelling technique, the operating principle and linearity characteristics of the adjustable magnetic spring are studied. The use of a magnetic spring with an adjustable negative spring constant could enable an ocean generator to continuously operate in a resonant state, thereby greatly increasing its power generation capability. The described variable stiffness spring could also be useful in other energy harvesting applications, robotic actuator applications, and/or other applications.

20 Claims, 22 Drawing Sheets (a)

(b)

(a)

(b)

VARIABLE STIFFNESS MAGNETIC SPRING

CROSS REFERENCE TO RELATED APPLICATION

This application claims the benefit of U.S. Provisional Application No. 62/888,992 filed Aug. 19, 2019 and entitled "Variable Stiffness Magnetic Spring," which is herein incorporated by reference in its entirety.

ACKNOWLEDGMENT OF GOVERNMENT SUPPORT

This invention was made with government support under Grant/Contract number DE-EE0008631 awarded by The United States Department of Energy (DOE). The government has certain rights in the invention.

FIELD

This application relates to a magnetic spring having an adjustable stiffness and related systems in which the magnetic spring may be deployed.

BACKGROUND

Magnetic springs may be used in a wide variety of applications, including actuation of mechanical components (e.g., robotic actuators), wave energy conversion, microelectricalmechanical system (MEMS) energy harvesting, and/or other applications. As a representative example, the application of magnetic springs in wave energy conversion will be described below.

A Wave Energy Converter (WEC) is used to transform energy from waves into useable electricity. The WEC may include a primary converter and a Power Take-Off (PTO). The primary converter may include an enclosed chamber for an oscillating water column or a point absorber buoy that is positioned on or in a water body (e.g., the ocean), while the PTO is the mechanism with which the absorbed energy by the primary converter is transformed into the useable electricity. Hydraulic PTOs are commonly used in Wave Energy Converters (WECs) due to their very high force density, for instance hydraulic pistons can operate at a pressures of up to 38 MPa. However, hydraulic PTO generator systems are typically only efficient over a narrow operating region. In addition, the use of hydraulic fluid results in the need for regular maintenance and poses a serious leakage hazard. As an alternative, electromechanical generators with mechanical gearing are often considered. However, due to the mechanical contact between parts, electromechanical generators suffer from reliability issues and therefore their operational design life is limited, particularly if regular servicing is not undertaken.

To improve reliability, a large number of WECs are using direct-drive (DD) electromagnetic generators. As motion is entirely created from non-contact interaction, a DD generator can operate at a high efficiency. However, the force density of a DD generator is constrained by the current density (heat) and magnetic saturation and therefore the force density of a DD generator is not high relative to a hydraulic, electromechanical, or pneumatic PTOs. DD generators have been reported to have volumetric force densities in the range of 0.3 kN/L with air-gap magnetic shear stress values in the range of 0.053 MPa at rated value.

Recently, a new type of magnetic lead screw has been invented that can convert very low speed linear motion into high speed rotary motion. As the magnetic lead screw relies only on magnetic field interaction, and no current excitation, very high magnetic force densities can be achieved. For instance, in a magnetic shear stress value of 0.18 MPa was reported. However, as the magnetic lead screw's translator contains a large amount of magnet material, this makes it very costly for WEC use. If there was a way of creating the force without the translator being composed of magnets, then this could greatly improve the benefit of using the magnetic lead screw technology.

For rotary-based PTOs, rotary magnetic gearboxes are currently being studied as an alternative to their mechanical geared counterparts. A magnetic gear can create speed-change without any physical contact and therefore if magnetic gears with suitably high torque densities can be demonstrated then they could greatly increase the reliability of a WEC PTO.

Waves have a broad frequency band that experiences changes with time, season, and weather events. However, WECs may operate with a power response in a narrow frequency range, whereby the efficiency in absorbing wave energy peaks near the natural frequency, $\omega_o$. For example, a WEC and the PTO can be represented as a mass-spring-damper system, an electrical analogy of which is shown in FIG. 1 as system 100. The wave energy device 102 (e.g., the primary converter of the WEC) has an impedance, Zw, corresponding to a mass, M, damping, $B_w$, and spring constant, $K_w$, while the generator 104 has an impedance, $Z_g$, corresponding to a damping $B_g$ and spring constant $K_g$.

In order to be at resonance (e.g., to increase the overlap between the changing wave spectrum and the response of the converter), and therefore maximize power extraction, the PTO (generator) and WEC (wave energy device) damping term must be equal: $B_g(t)=B_w(t)$. If the damping is set too low, the oscillator (e.g., within the buoy or other moving element of the primary converter in the WEC) will move too much with regard to incoming waves and little power will be extracted. If the damping is set too high, the amplitude of motion will be limited, resulting in low power extraction. Further, the stiffness and mass must be related according to the forcing frequency by:

$$\omega_o(t) = \sqrt{\frac{K_w(t) + K_g(t)}{m}} \tag{1}$$

As wave motion is slow the resonance frequency, $\omega_o$, is always small. Therefore, in order for the WEC to be at resonance either the mass, m, has to be very large or the total system spring constant term on the numerator of (1) must be small. If the PTO spring constant, $K_g(t)$, could actively be controlled to have a varying negative value then the PTO reactance could be made to match the WEC reactance and the WEC could then be made to operate continuously at resonance.

One approach to making the PTO operate with a negative spring constant is to use a DD generator with active current control. The DD generator will provide the generator forces that mimic a negative spring constant. The generators voltage and current are related to the WEC damping and stiffness terms respectively. Therefore, in order to provide both a sizable generator damping as well as negative stiffness, the generator voltage and current must be highly out of phase and thus an extremely large amount of reactive power must be created by the generator. This vastly increases the generator and power electronic converter cost.

Another option is to use a mechanical spring with a negative spring constant. For instance, a set of three symmetrically separated springs may be used to create an adjustable negative spring constant. Using this approach, with suitable controls, the power output can be increased by a factor of six relative to a detuned WEC. However, as the PTO in this example relies on a mechanical gear and pneumatics the long-term reliability of such a PTO will be questionable. In addition, the efficiency of pneumatic springs is not high.

In order to improve the reliability and efficiency of the PTO, a magnetic spring could potentially be used. However, the force between opposing magnets decreases rapidly with distance and therefore it has been difficult to determine a magnet arrangement that can creates a linear spring constant. In FIG. 2, example configurations (a), (b), and (c) illustrate three magnet/steel arrangements 200a, 200b, and 200c, respectively. In each configuration, the central component (e.g., the central steel element in arrangement 200a, the central steel/magnet element in arrangement 200b, or the central magnet element in arrangement 200c) and the outer components (e.g., the left and right magnet elements, shown with upward-directing and downward-directing polarity, respectively) are moveable relative to one another, as represented by the vertical displacement term, y. However, due to the magnetic interaction of the elements, the spring force (e.g., the force urging the moving component back to a zero, or resting, position) changes based on the position of the elements relative to one another (e.g., the force generally becomes increasingly positive as displacement increases in a first direction and becomes increasingly negative as displacement increases in a second, opposite direction). In other words, when moved away from a resting position (e.g., due to effects of wave movement), the spring exerts an opposing force based on the displacement. Due to the arrangement of components in arrangements 200a, 200b, and 200c, the force-to-displacement relationship is non-linear. For example, the corresponding non-linear force relationships of these configurations is shown in plot 300 of FIG. 3. Plot 300 shows how in each case of arrangements 200a (corresponding to "Design (a)"), 200b (corresponding to "Design (b)"), and 200c (corresponding to "Design (c)"), the change in force, plotted on the y-axis, is non-linear with respect to vertical position of the moving element, plotted on the x-axis. It can be noted that linearity can often be achieved close to the equilibrium (e.g., at the zero vertical position for the arrangement) but only for a small displacement.

As described above, a linear spring force-to-displacement relationship (e.g., linear spring constant) is ideal for maximizing efficiency of the spring. Additional spring characteristics that affect operation of the spring include maximum force exerted by the spring and stroke length (e.g., maximum displacement that the spring can experience). Example topologies of magnetic springs (e.g., arrangements of magnets, where polarity of the magnets is shown by arrows within the magnets, and where example movement and resulting spring force directionality is shown via arrows extending from a moveable magnet in each arrangement) with deficiencies in these areas are shown in FIG. 4. For example, arrangements 400a, 400b, 400c, and 400d may have a limited stroke length with non-linear spring constant. Arrangements 400e, 400f, 400g, 400h, and 400i could have longer stroke length than the other arrangements of FIG. 4, but the linear region of the stroke length is very limited.

The performance of a negative magnetic springs has also been investigated, for instance negative magnetic springs used for structural vibration isolation. However, in such examples, the stiffness of the negative magnetic springs cannot be changed. In some systems, a rotary magnetic torsion spring can have an adjustable spring constant by axially shifting the rotors. However, in these systems the magnetic spring stiffness is not linear (e.g., there is not a linear force-to-displacement relationship for the spring). Thus, these configurations suffer from the same issues as the above-described arrangements.

SUMMARY

The disclosure describes a new type of variable stiffness magnetic spring, which may be used in applications such as wave energy conversion/collection, robotic actuator applications, MEMS energy harvesting, and other applications as noted above. The magnetic spring described herein may have an adjustable stiffness as well as high force density, long stroke length, and highly linear force-to-displacement relationship (e.g., across a majority of the stroke length).

An example variable stiffness magnetic spring includes a first magnetic component and a second magnetic component, where the first magnetic component is rotatable relative to the second magnetic component, and where the first magnetic component is translatable relative to the second magnetic component, or the second magnetic component is translatable relative to the first magnetic component. In some embodiments of the magnetic spring, the polarity of the first magnetic component may be orthogonal to the polarity of the second magnetic component. In additional or alternative embodiments of the magnetic spring, the second magnetic component may include at least a first magnet and a second magnet, a polarity of the first magnet being in an opposing direction to a polarity of the second magnet. In additional or alternative embodiments of the magnetic spring, the second magnetic component may include a plurality of magnets arranged in a ring, and adjacent magnets in the ring may have polarities in opposing directions to one another. In additional or alternative embodiments, the ring of magnets in the second magnetic component may be a first ring, and the first magnetic component may include a plurality of magnets arranged in a second ring, where adjacent magnets in the second ring have polarities in opposing directions to one another. In some examples, the first magnetic component may further include a plurality of magnets arranged in a third ring, where adjacent magnets in the third ring have polarities in opposing directions to one another, and where the first ring is positioned between the second ring and the third ring along an axis of rotation of the first magnetic component. Additional examples of variable stiffness magnetic springs are described throughout the disclosure.

The foregoing and other objects, features, and advantages of the invention will become more apparent from the following detailed description, which proceeds with reference to the accompanying figures.

DETAILED DESCRIPTION

As used in this application, the singular forms "a," "an," and "the" include the plural forms unless the context clearly dictates otherwise. Additionally, the term "includes" means "comprises." Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Figure 1:
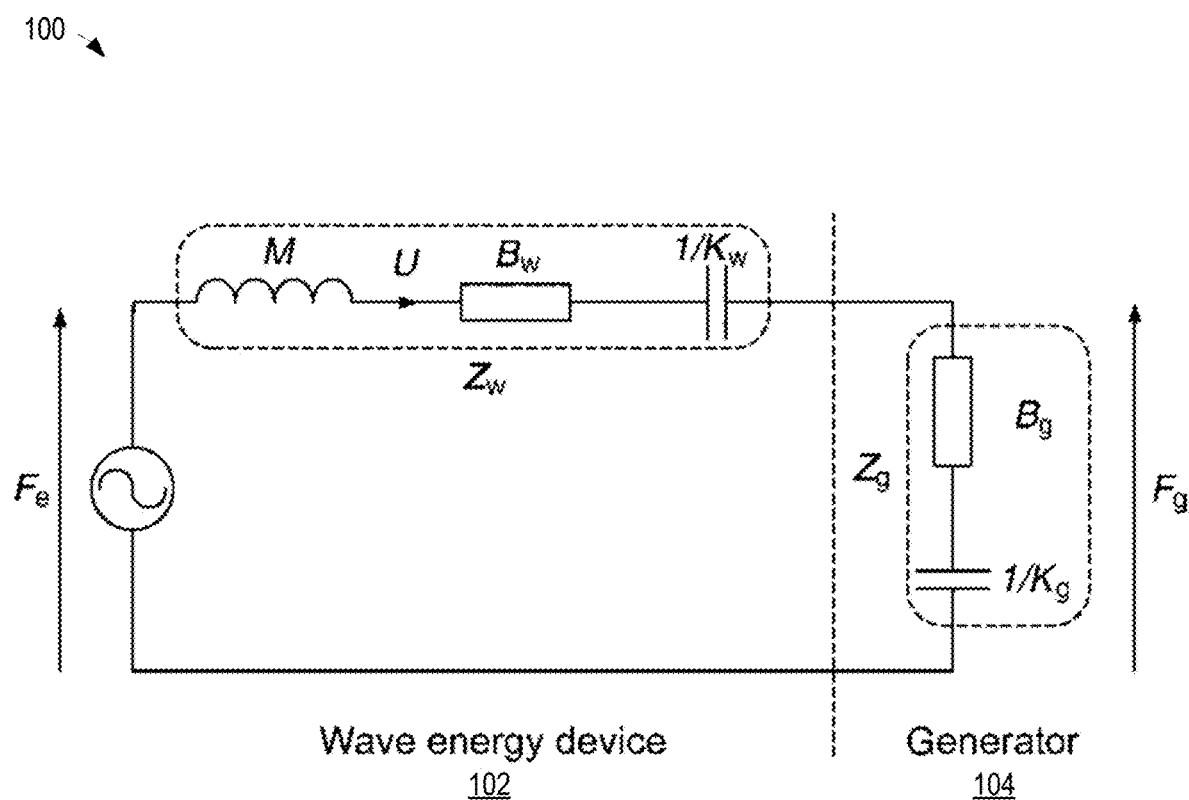
FIG. 1 schematically shows an example electrical analogy of a mass-spring-damper system in a wave energy conversion system.
Figure 2:
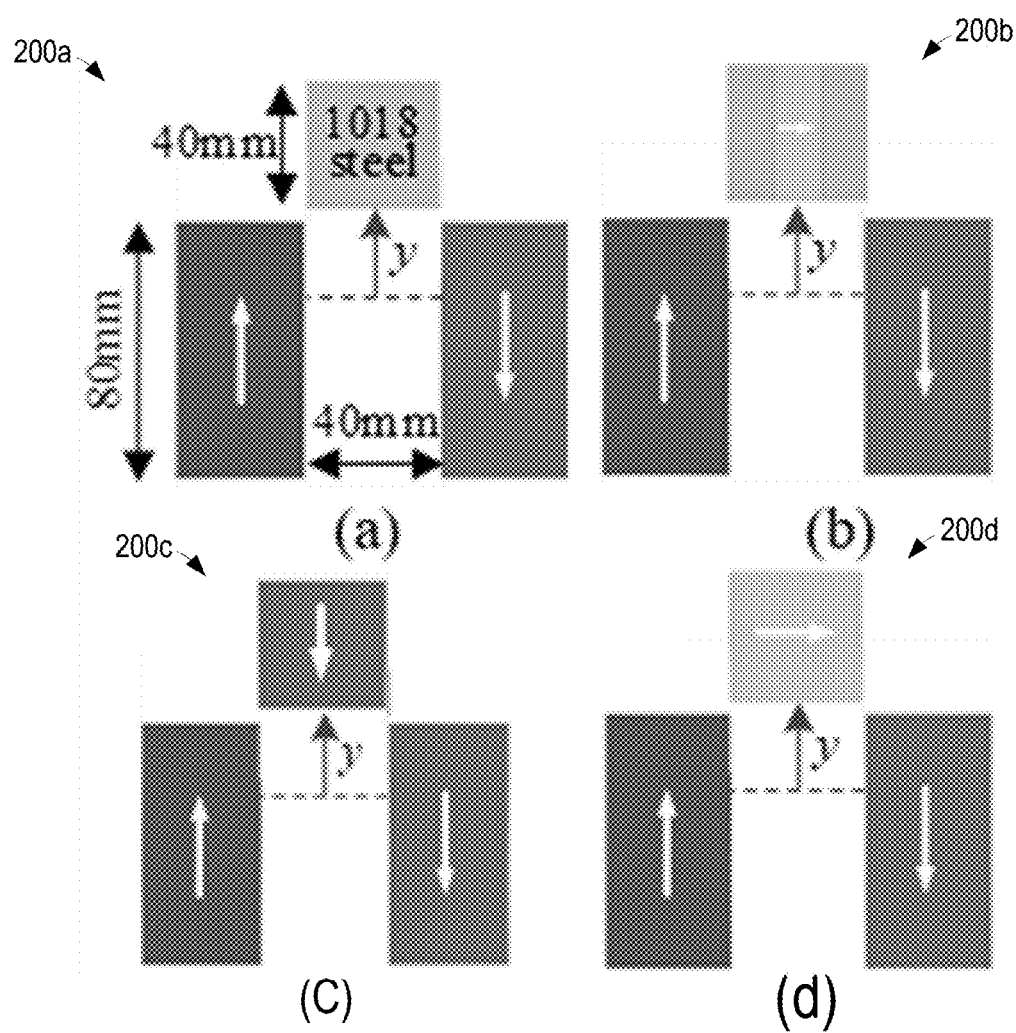
FIG. 2 schematically shows example configurations of magnet and/or steel arrangements for associated magnetic springs.
Figure 3:
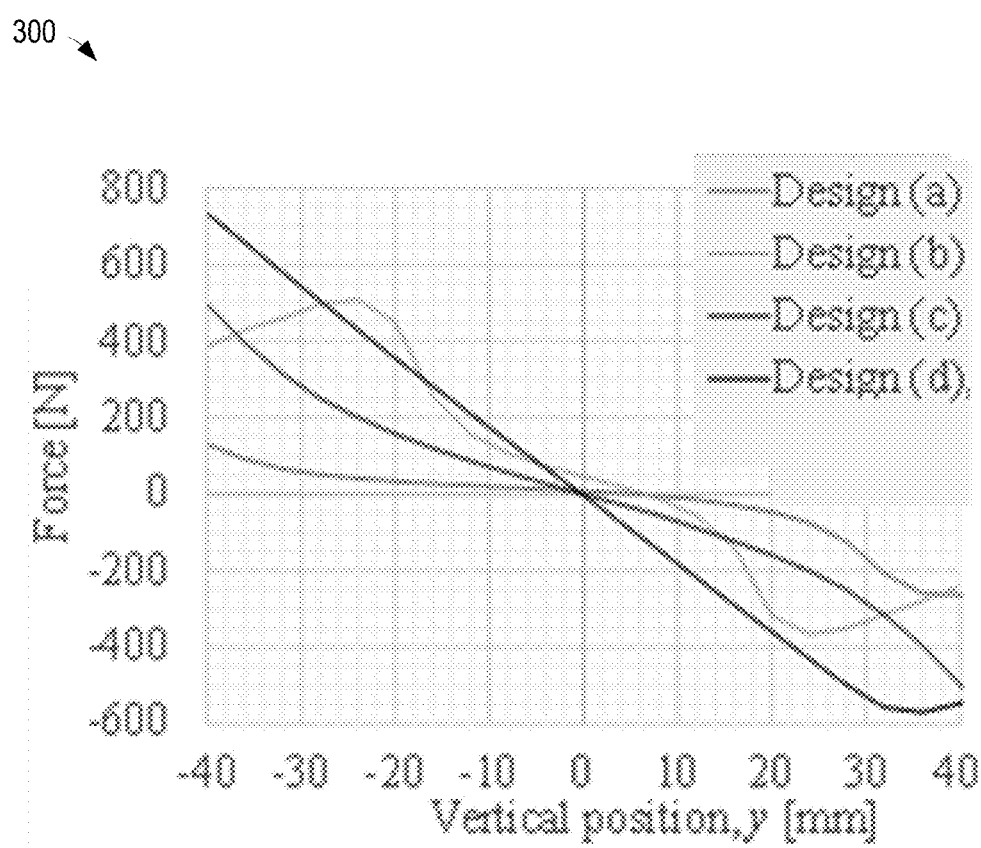
FIG. 3 shows an example plot of force relationships for the different configurations of FIG. 2.
Figure 4:
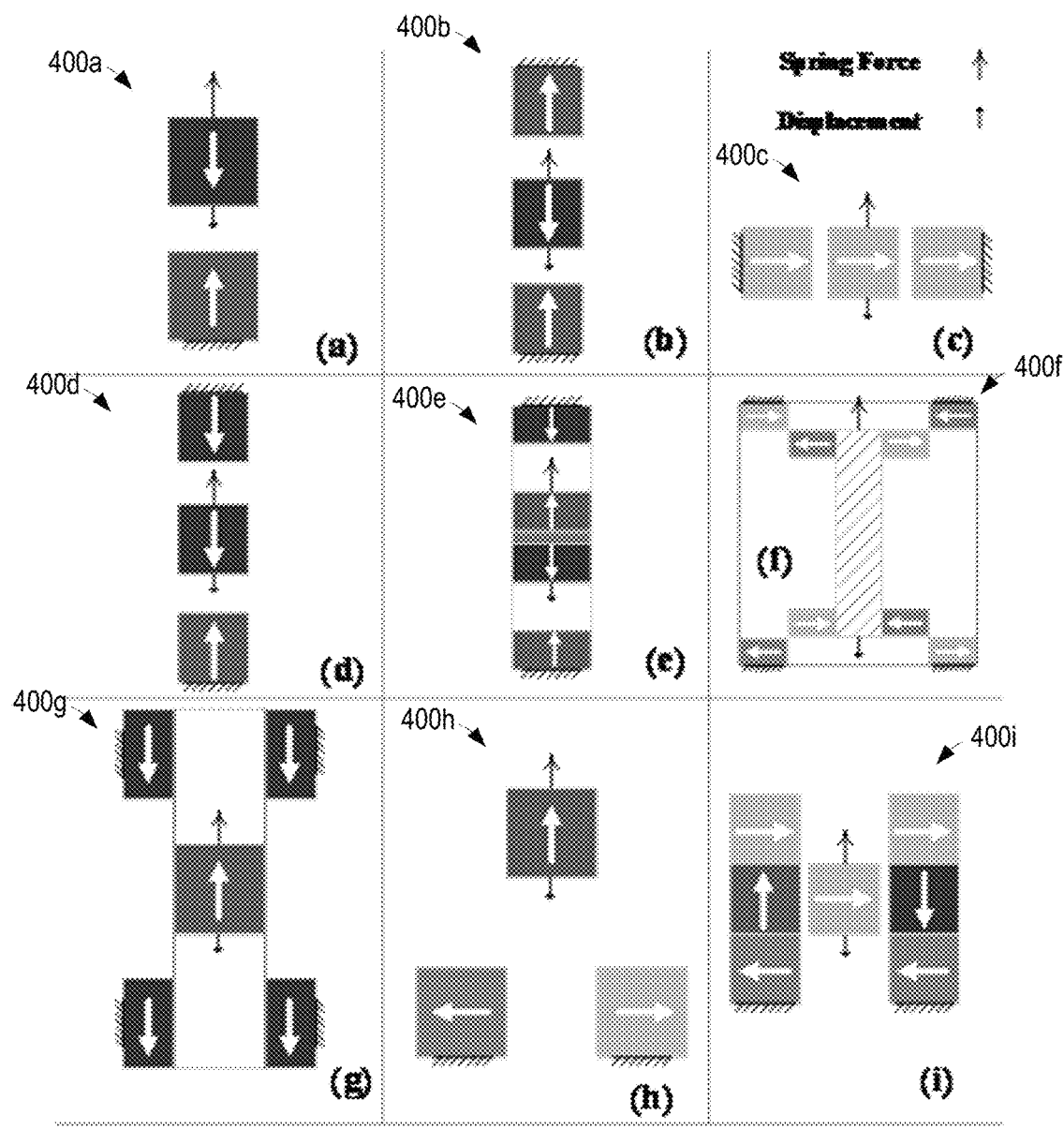
FIG. 4 shows further example arrangements of magnets for associated magnetic springs.
Figure 5:
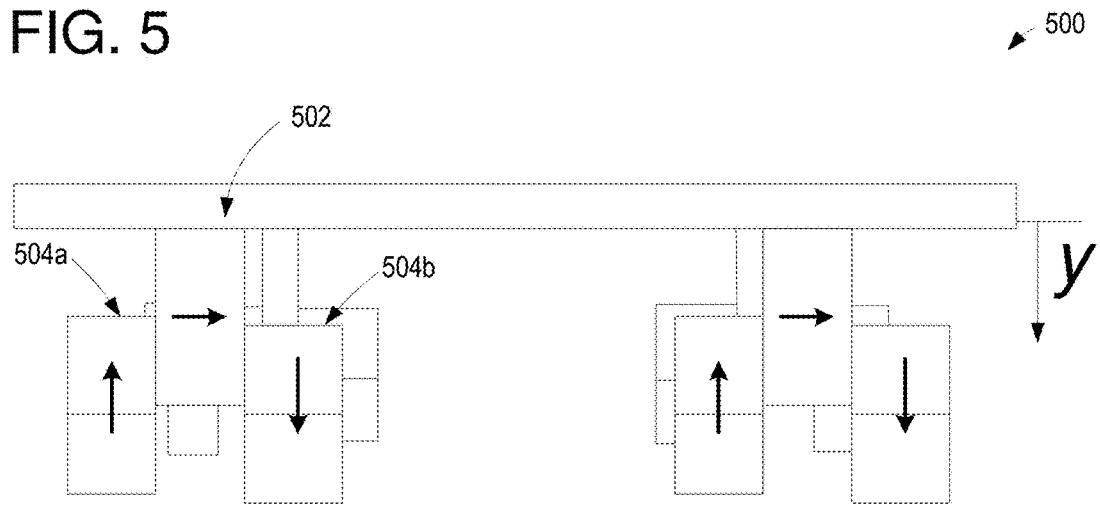
FIG. 5 shows a prototype of magnets arranged to form a magnetic spring according to one example of the disclosure.
Figure 6:
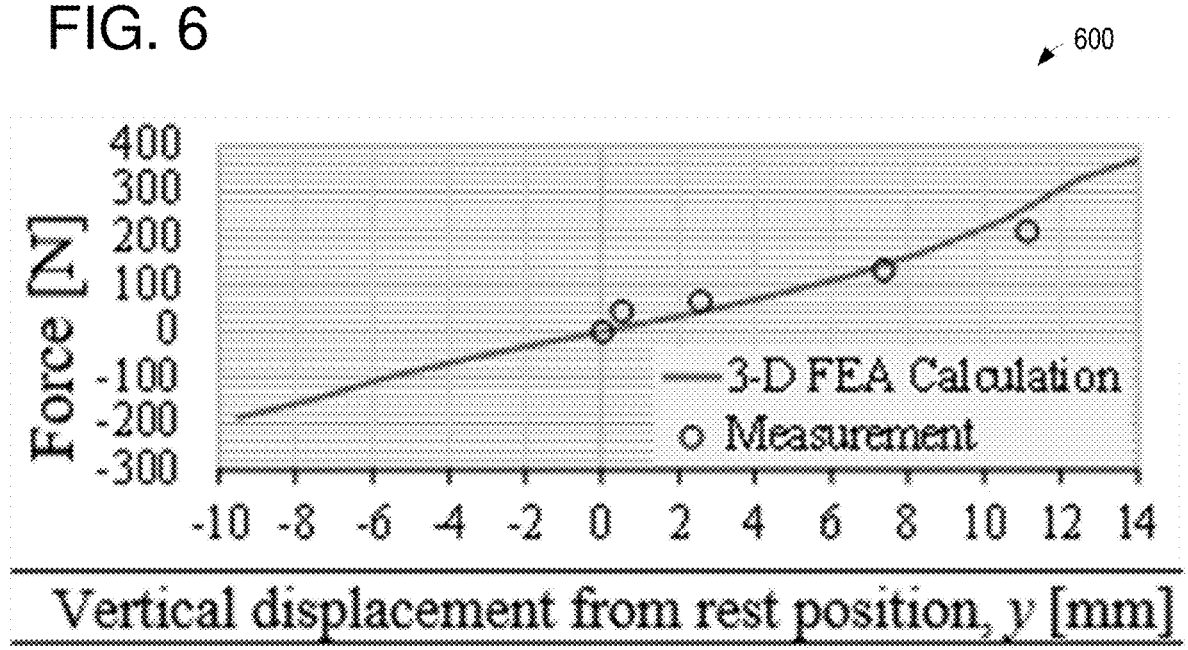
FIG. 6 shows an example plot of a force response to vertical displacement for the prototype of FIG. 5.

As described above, a magnetic spring may be used in many applications, and may benefit from exhibiting spring characteristics such as linear force-displacement relationship, long stroke length, and high maximum force. Arrangement 200d of FIG. 2 schematically shows an example arrangement of magnets that may be used to achieve a linear force-displacement relationship, as shown by the associated force relationship (corresponding to "Design (d)") illustrated in plot 300 of FIG. 3. A small prototype 500 that verified the linearity of the forces is shown in FIG. 5 and measurement results of force response to vertical displacement from rest position are shown in plot 600 of FIG. 6. The view of prototype 500 shows the magnets arranged in a resting or zero position, whereby a central magnet, such as magnet 502 is vertically positioned approximately halfway down the length of two outer magnets, such as magnets 504a and 504b.

Figure 7:
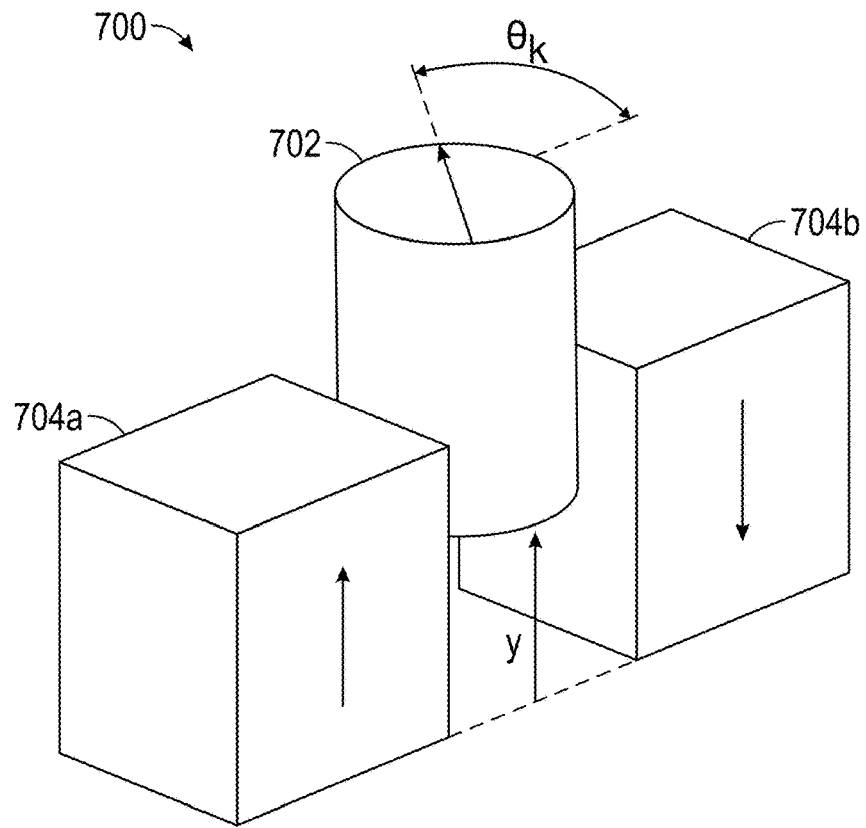
FIG. 7 schematically shows an example adjustable magnetic spring with a cylindrical central magnet.
Figure 8:
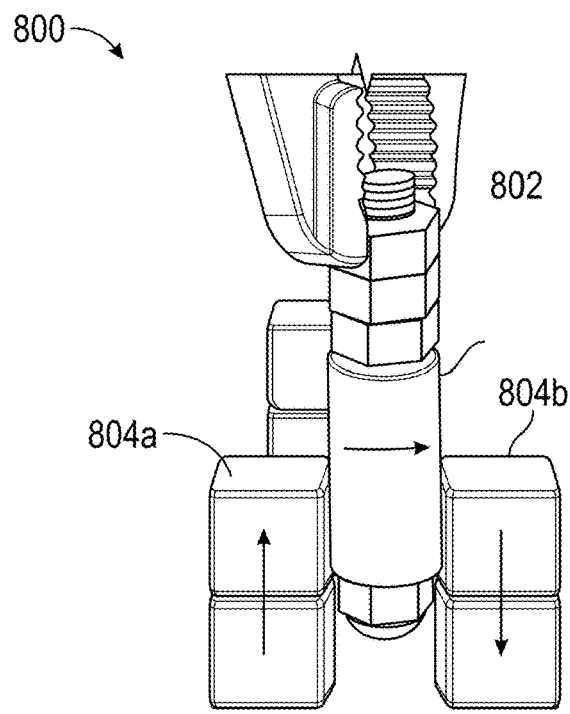
FIG. 8 shows another example magnetic spring with a cylindrical central magnet.

If the central magnet is made circular rather than rectangular, like as shown in FIGS. 7 and 8, then by turning the magnet the spring constant can be adjusted, and when rotated by more than 90° the spring constant starts to be negative. This rotation allows the formation of an adjustable magnetic spring (AMS). For example, FIG. 7 schematically shows an AMS 700 with a stroke position y. The stiffness (e.g., spring constant) of the AMS can be varied by the rotation of the circular central magnet 702 relative to the rectangular magnets 704a and 704b, as represented by rotary position $\theta_k$. In the figures of this disclosure, polarity of the magnets is represented by the arrows shown inside the magnets (or representations thereof). For example, in FIG. 7, the rectangular magnets 704a and 704b have opposite polarity from one another and the polarity of the central magnet 702 is generally orthogonal to the polarity of the rectangular magnets and directed based on the rotary position $\theta_k$. FIG. 8 shows an example of an AMS 800 using real magnetic components arranged similarly to the schematic representation in FIG. 7, whereby central magnet 802 is analogous to central magnet 702 of FIG. 7 and rectangular magnets 804a and 804b are analogous to rectangular magnets 704a and 704b, respectively, of FIG. 7.

Figure 9:
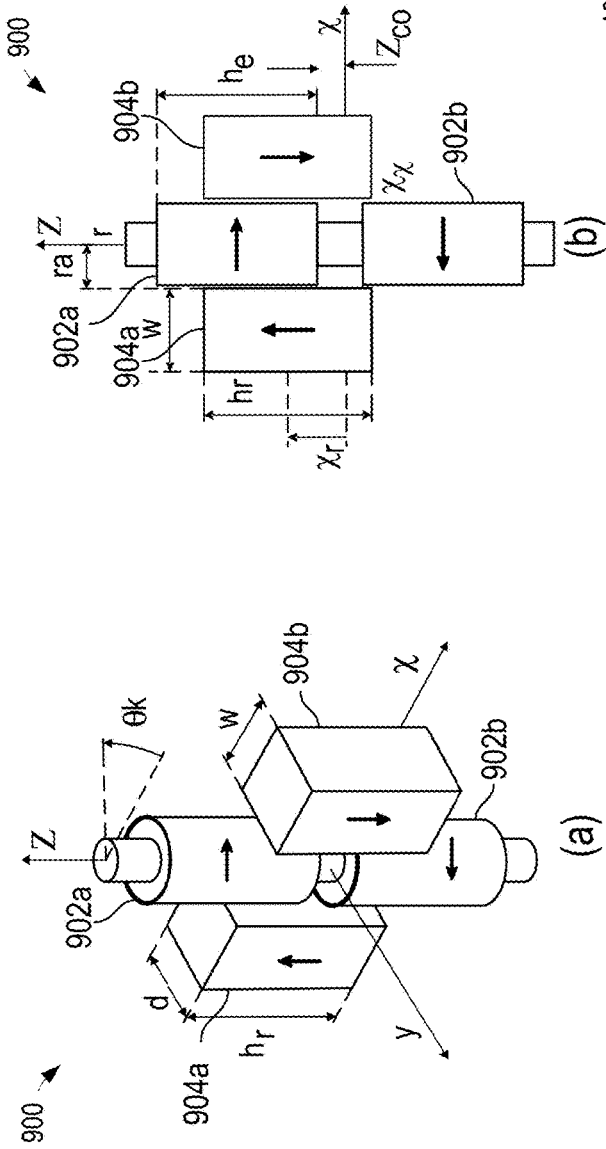
FIG. 9 schematically shows an example configuration of a proof-of-principle adjustable magnetic spring.

An example configuration of a proof-of-principle adjustable magnetic spring 900 is shown in FIG. 9, and includes four (e.g., Neodymium-Iron-Boron, Nd—Fe—B) permanent magnets. The magnetic spring 900 is shown in an isometric view in (a) and a front view in (b). In the illustrated example, the two cylindrical tube magnets 902a and 902b are magnetized diametrically and allowed to rotate only around the z-axis. Further in the illustrated example, the two rectangular cuboidal side magnets 904a and 904b are mechanically allowed to move only translationally along the z-axis, and they are magnetized in opposite directions from one another along the z-axis as shown. In other examples, the cylindrical tube magnets 902a and 902b may be configured to move only translationally along the z-axis while the two rectangular cuboidal side magnets 904a and 904b may be configured to rotate only around the z-axis. It is to be understood that the disclosure may pertain to any configuration that enables the cylindrical tube magnets to be rotatable and translatable relative to the rectangular cuboidal side magnets.

Figure 10:
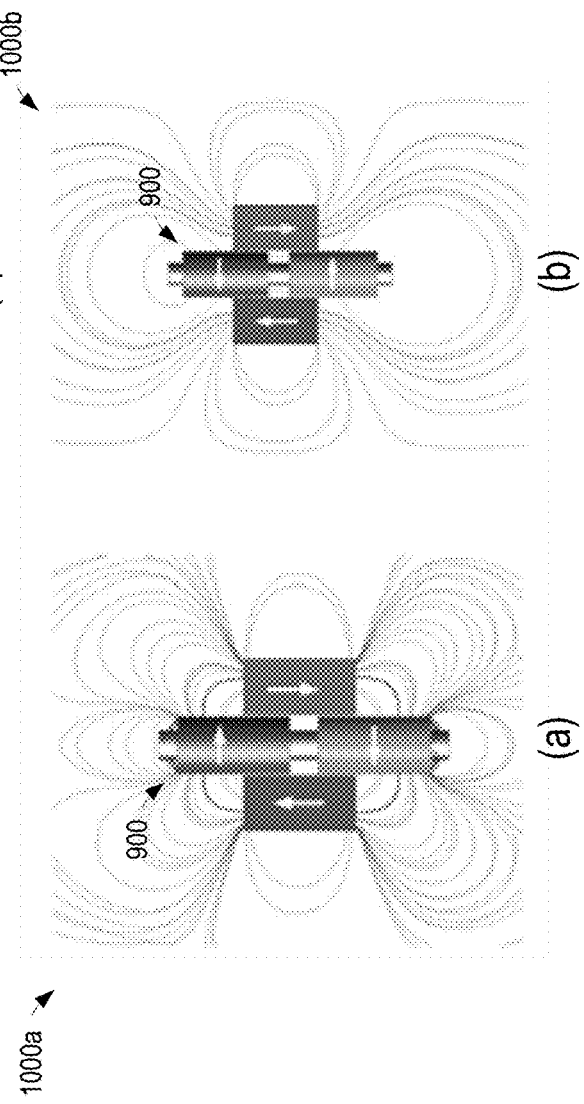
FIG. 10 schematically shows an example plot of field lines for the example configuration of FIG. 9.

X-y axis field plots 1000a and 1000b showing the field lines for all the magnets of magnet spring 900 is shown in FIG. 10 for the case when the cuboidal magnets are vertically offset at a rotor angle positions of $\theta_k=0°$ (view (a)) and $\theta_k=180°$ (view (b)), respectively. When the magnets are centered at $\theta_k=0°$, as shown in view (a) of FIG. 10, the field lines circulate around through all the magnets providing a positive stiffness whereas when the central tube magnets are rotated to $\theta_k=180°$, as shown in view (b) of FIG. 10, the cylinder tube magnets are fully opposing the cuboidal magnets a negative spring stiffness value is created. The cylinder tube magnets can be rotated around between these two extremes yielding a continuous range of spring stiffness values. A stepper motor with brake may be utilized, which allows the stiffness to be adjusted and held fixed without then expending power to maintain the spring stiffness value, as would be the case if a linear motor was used to create the linear force.

The geometric values for the proof-of-principle adjustable magnetic spring are shown in Table Ia below. The air-gap space between the cylindrical tube magnet and rectangular cuboidal magnet is g=0.5 mm and the Nd—Fe—B magnet grade is N50.

TABLE Ia

Adjustable Magnetic Spring Parameters

| | Description | Value | Units |
| --- | --- | --- | --- |
| Rectangular cuboidal magnets | Height, $h_r$ | 25 | mm |
| | Width, w | 12.5 | mm |
| | Depth, d | 12.5 | mm |
| | Lateral offset, $x_R$ | 6.75 | mm |

TABLE Ia-continued

Adjustable Magnetic Spring Parameters

| | Description | Value | Units |
| --- | --- | --- | --- |
| Diametric cylindrical tube magnet | Height, $h_c$ | 25 | mm |
| | Inner radius, $r_i$ | 3.175 | mm |
| | Outer radius, $r_o$ | 6.25 | mm |
| | Axial separation gap from center, $z_{co}$ | 3.25 | mm |
| Air gap between cylinder and cuboidal magnet, g | | 0.5 | mm |

Figure 11:
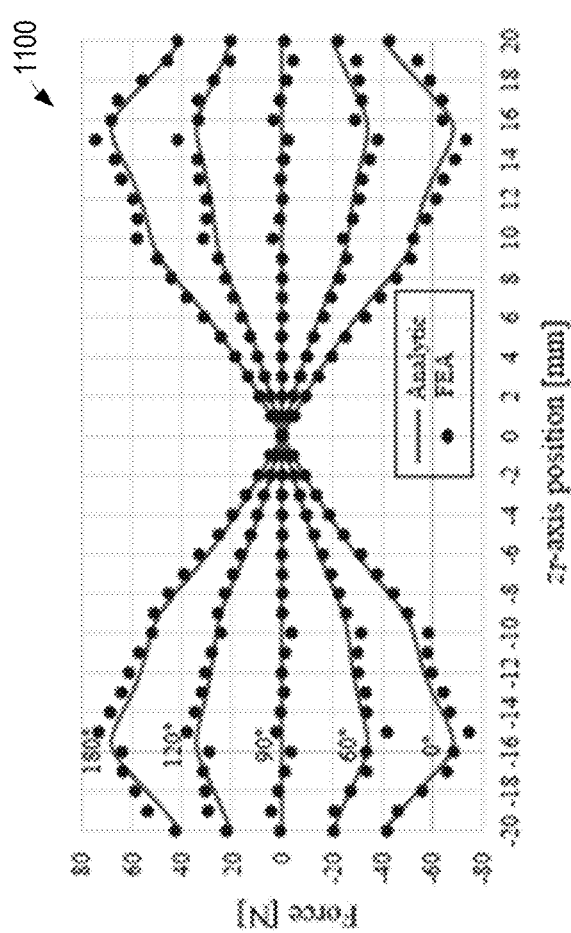
FIGS. 11 and 12 respectively show plots of force and torque created by an example magnetic spring.
Figure 12:
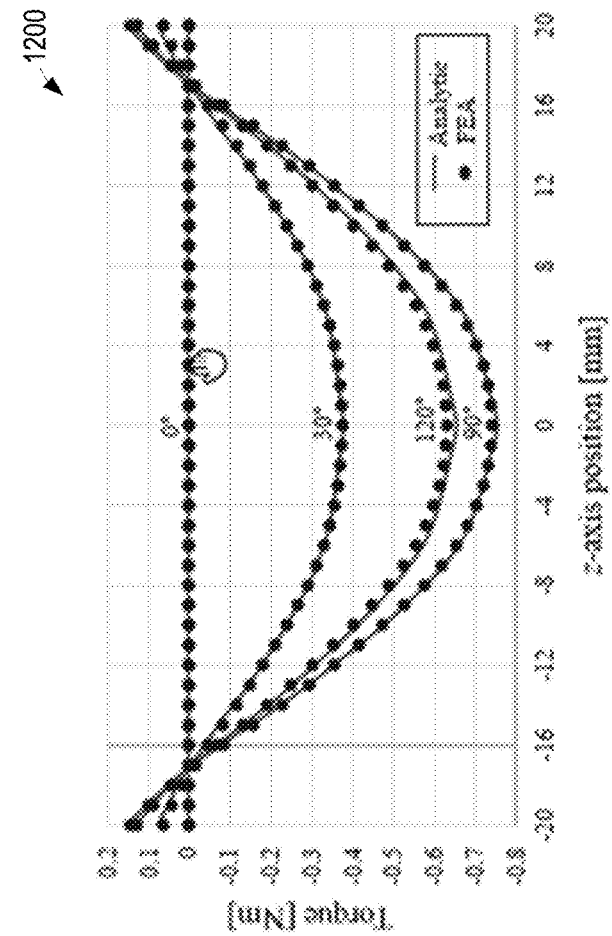

FIG. 11 and FIG. 12 respectively show the force and torque created by the magnetic spring as a function of both rotation angle, $\theta_k$, and translational displacement, $z_T$. For example, FIG. 11 shows a plot 1100 of a force comparison between the analytic based modelling approach and finite element analysis (FEA) model, whereby the linear region is shown as being symmetric. FIG. 12 shows a plot 1200 of a torque comparison between the analytic based modelling approach and the FEA model. It can be seen that whilst the force is linear between the stroke length of $z_T=\pm 10$ mm the force is not fully linear up to the peak force. In order to study the force relationship and improve the stroke length characteristics a 3-D analytic-based model was recently developed. In this model the magnetics field was computed using magnetic charge functions and then the force was computed using the magnetic energy, U. For instance, the torque as a function of translational displacement, $z_T$, and rotation angle, $\theta_k$, can be computed using $$T_z(\theta_k, z_T) = \frac{\partial U(\theta_k, z_T)}{\partial \theta_o}\bigg|_{\phi_r=constant} \quad (2)$$

where $\phi_r$=magnetic scalar potential. The force can be evaluated from $$F_z(z_T, \theta_k) = \left| = -\frac{\partial U(z_T, \theta_k)}{\partial z}\right|_{\sigma_o=constant} \quad (3)$$

where σc=magnetic charge function. Using the force and torque analytic equations FIG. 11 and FIG. 12 shows that a good match with the finite element analysis (FEA) simulated model was achieved.

Utilizing the analytic force-torque model a parametric sweep analysis was conducted. The following parameter relationships were investigated:
  A. Cylindrical magnet separation length
  B. Magnet height ratio
  C. Height-to-width ratio
  D. Cuboidal depth-to-width ratio
  E. Cylindrical tube diameter-to-width ratio The objective of the analysis was to gain a better intuitive understand of the force relationships whilst also trying to maximize the force density. The force density is defined as $$F_d = \frac{\max(F_z(0, z_T))}{2[wdh_r + \pi(r_o^2 - r_i^2)h_c]\rho_m} \quad (4)$$

where ρm=7500 kg/m3 magnet density. The peak force at θk=0° was used to compute the force density. For analysis clarity the force plot and peak force in this section are only shown for the positive force-displacement region.

In the proof-of-principle design the cylindrical tube magnets were vertically separated by a distance, $z_{co}$=3.25 mm.

Figures 13, 14:
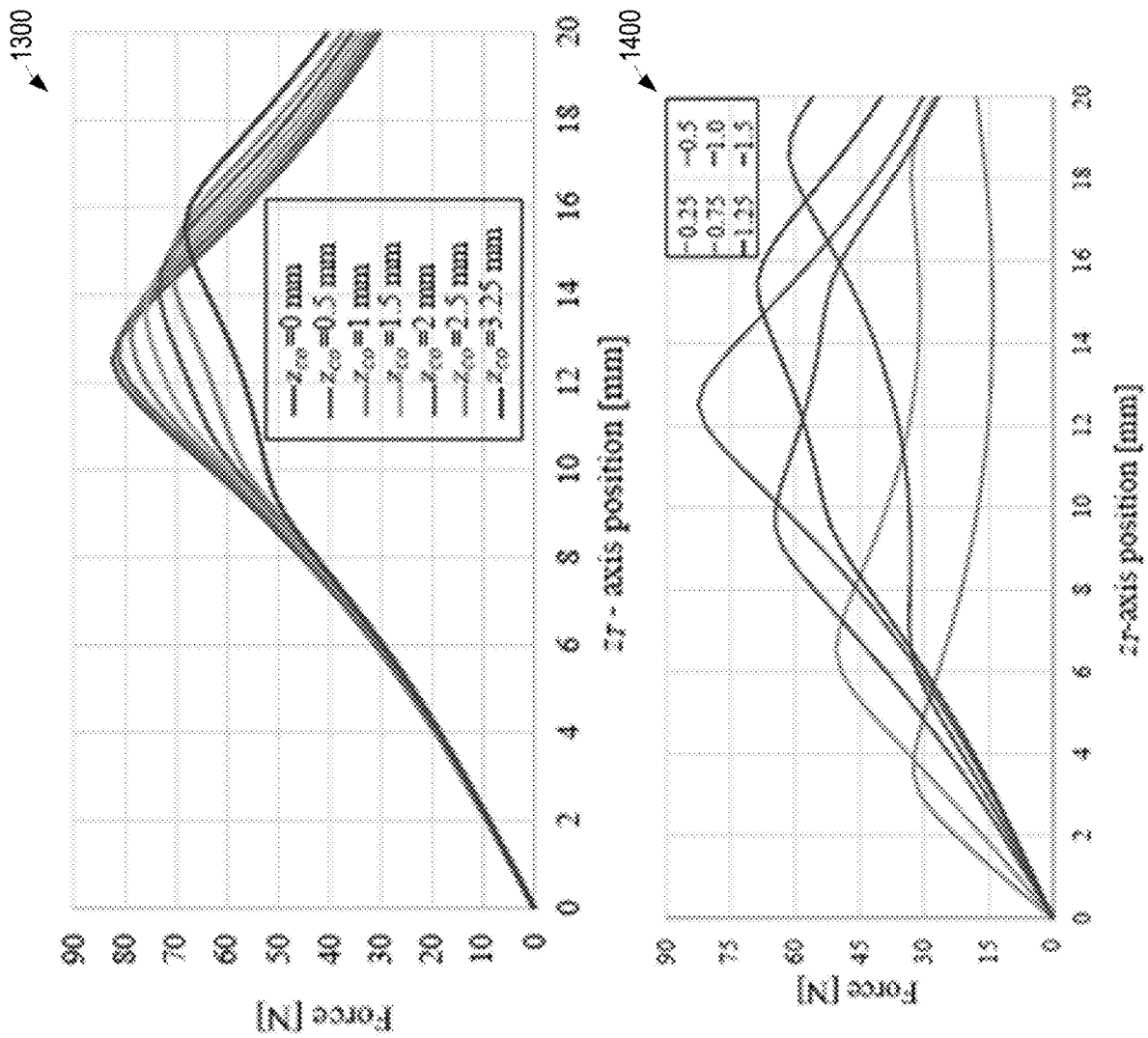
FIG. 13 shows an example plot of the change in axial force as a function of translational displacement, $z_T$ for different tube magnet separation lengths, $z_{co}$ in an example magnetic spring.
FIG. 14 shows an example plot of the force as a function of translational position for different height ratios for an example magnetic spring.

FIG. 13 shows the change in axial force as a function of $z_T$ for different tube magnet separation lengths, $z_{co}$. For example, FIG. 13 shows a plot 1300 of force-displacement relationships for different separation lengths between the two diametric magnetized cylindrical tube magnets. It can be seen that when $z_{co}=0$ the peak force is improved by 17% and the linear displacement region is maximized. Therefore, based on this analysis the separation length between the tube magnets was set to $z_{co}=0$ for the rest of this analysis.

Defining the maximum linear stoke length as $$z_m = \max(z_T), \qquad (5)$$

the stroke length displacement ratio can be defined as $$\Gamma_d = \frac{2 \cdot z_m}{h_c} = 1 \qquad (6)$$

where $h_c$=cylindrical tube magnet height.

A magnet height ratio can be defined as $$\Gamma_h = \frac{h_r}{h_c} \qquad (7)$$

where $h_r$=rectangular cuboidal height. A plot 1400 of the force as a function of translational position, $z_T$, for different height ratios, $\Gamma_h$, (e.g., when $\theta_k=0°$ and $(z_{co}, h_c)=(0, 25)$ mm) is shown in FIG. 14. When the cuboidal height is greater than the cylinder height the linear travel length, $z_T$, is not extended and the peak force is degraded. Therefore, a magnet relative height ratio $\Gamma_h=1$ is recommended.

Figure 15:
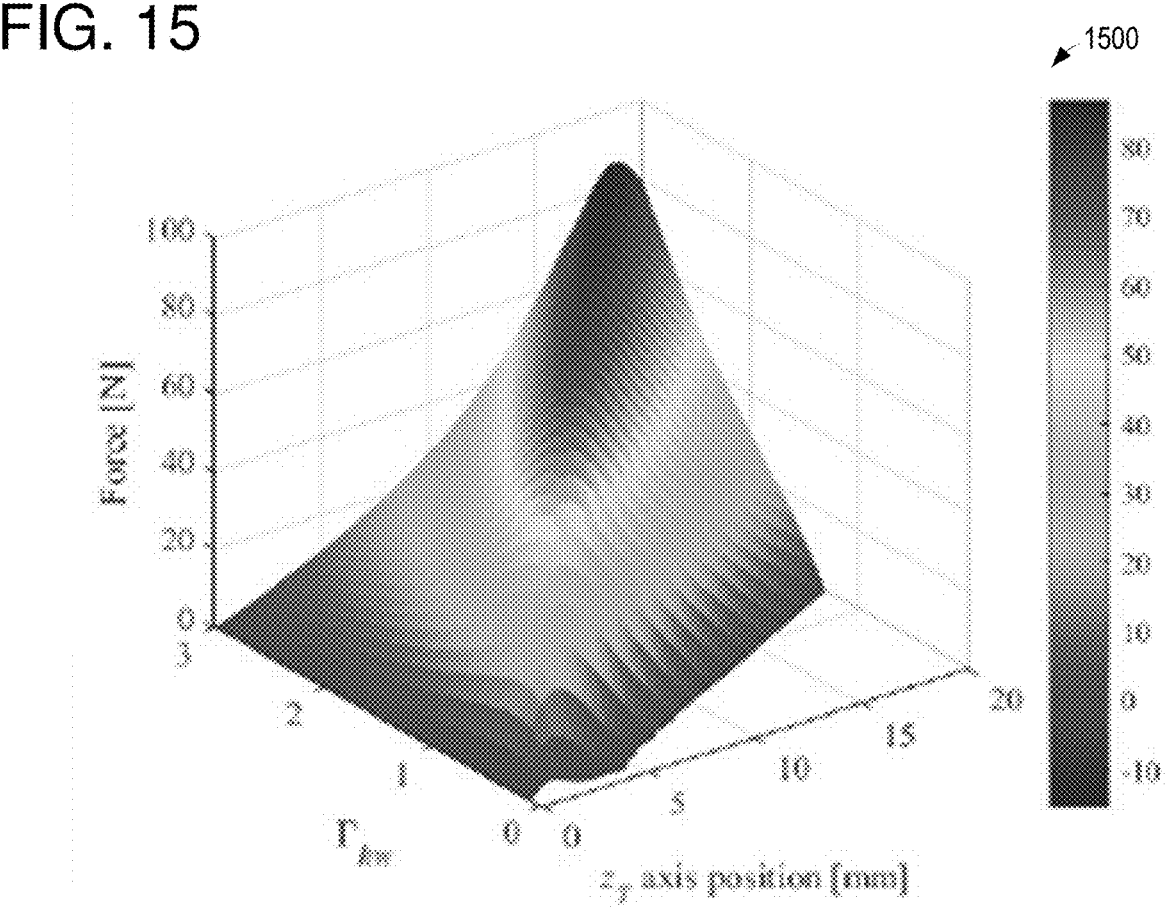
FIG. 15 shows an example plot of the force as a function of height-to-width ratio and axial offset position for an example magnetic spring.
Figure 16:
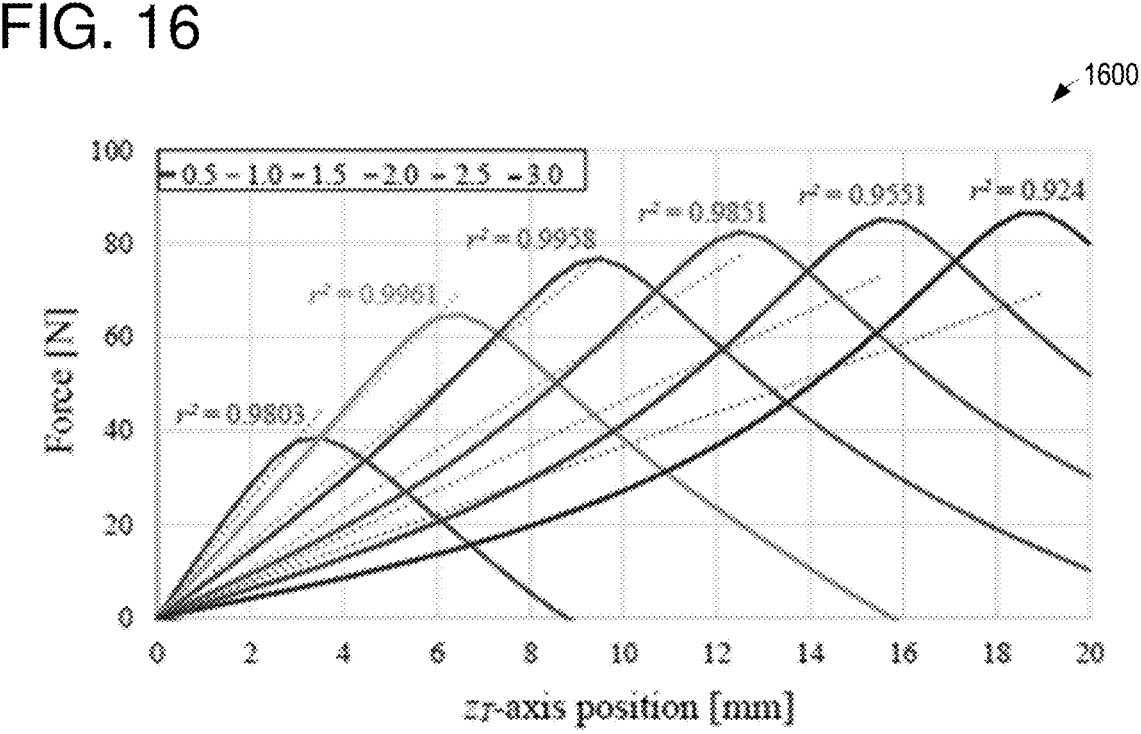
FIG. 16 shows an example plot of force as a function of axial position for different height-to-width ratios for an example magnetic spring.
Figure 17:
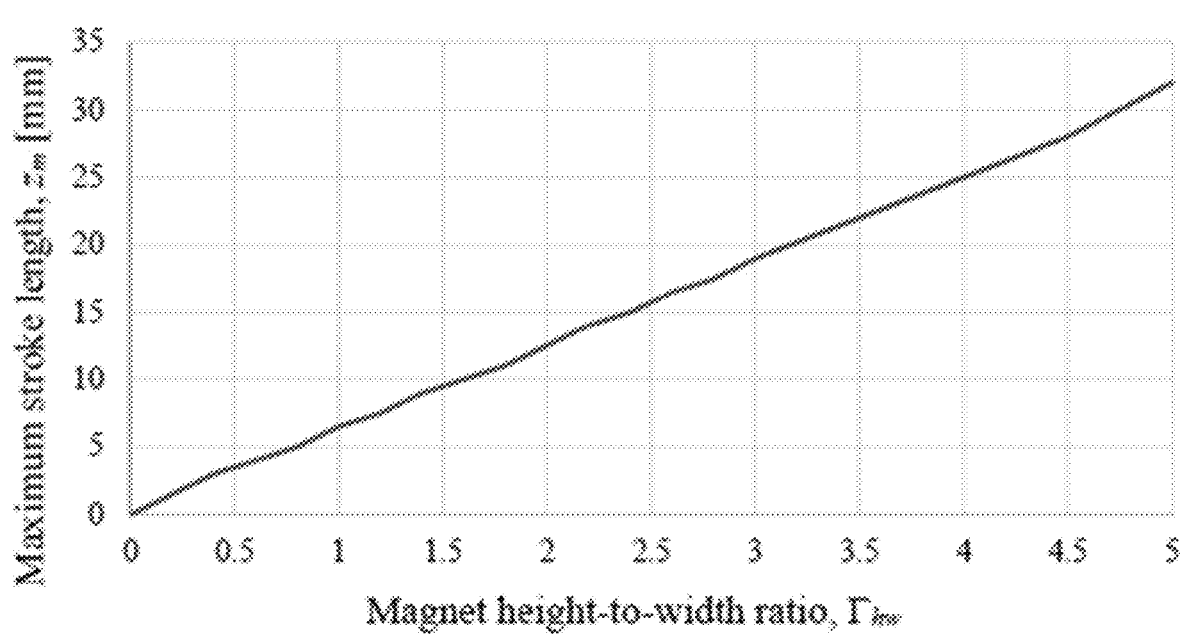
FIG. 17 shows an example plot of the relationship between the maximum force and maximum stroke length for an example magnetic spring.
Figure 18:
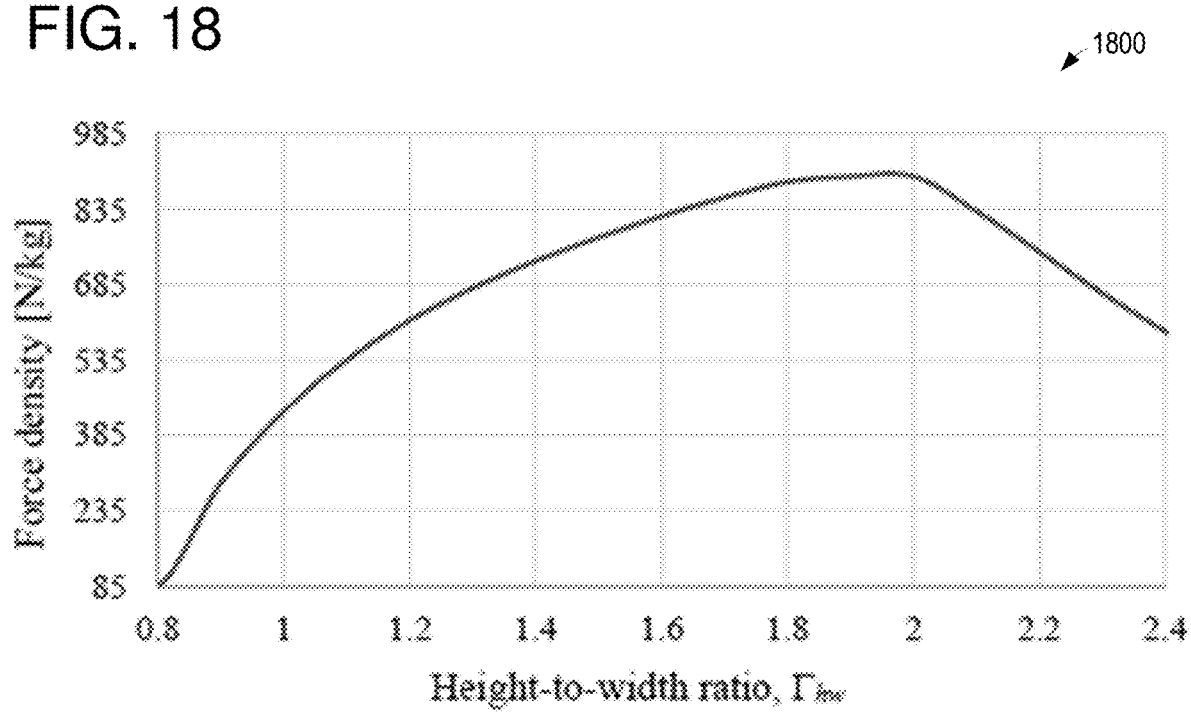
FIG. 18 shows an example plot of force density as a function of height-to-width ratio for an example magnetic spring.

Keeping the cylinder and cuboidal magnet height ratio equal, $\Gamma_h=1$, the cuboidal height-to-width ratio, defined as $$\Gamma_{hw} = \frac{h_r}{w} \qquad (8)$$

was varied for different translational offsets, $z_T$, the resulting plot 1500 is shown in FIG. 15. For example, plot 1500 shows the force as a function of height-to-width ratio, $\Gamma_{hw}$, and axial offset position, $z_r$, when $\Gamma_h=1$ and $(z_{co}, w, r_o)=(0, 12.5, 6.25)$ mm. It can be seen that as $\Gamma_{hw}$ increases the peak force and translational travel length increases. In FIG. 16 an $r^2$ correlation coefficient is also shown for each $\Gamma_{hw}$ plot and this shows that a smaller $\Gamma_{hw}$ improves the linearity. For example, FIG. 16 shows a plot 1600 of force as a function of axial position for different height-to-width ratios when $h_r=h_w$. The $r^2$ correlation coefficient is also shown, and is computed only up to the maximum force value. The relationship between the maximum force and maximum stroke length, $z_m$, is linear, which is shown in plot 1700 FIG. 17. However, when $\Gamma_{hw}$ increases the peak force increases at a diminishing rate. The force density as a function $\Gamma_{hw}$ is shown in plot 1800 of FIG. 18 and the peak occurs when $$\Gamma_{hw}=2. \qquad (9)$$

A depth-to-width ratio for the cuboidal magnet can be defined as $$\Gamma_{dw} = \frac{d}{w} \qquad (10)$$

Figure 19:
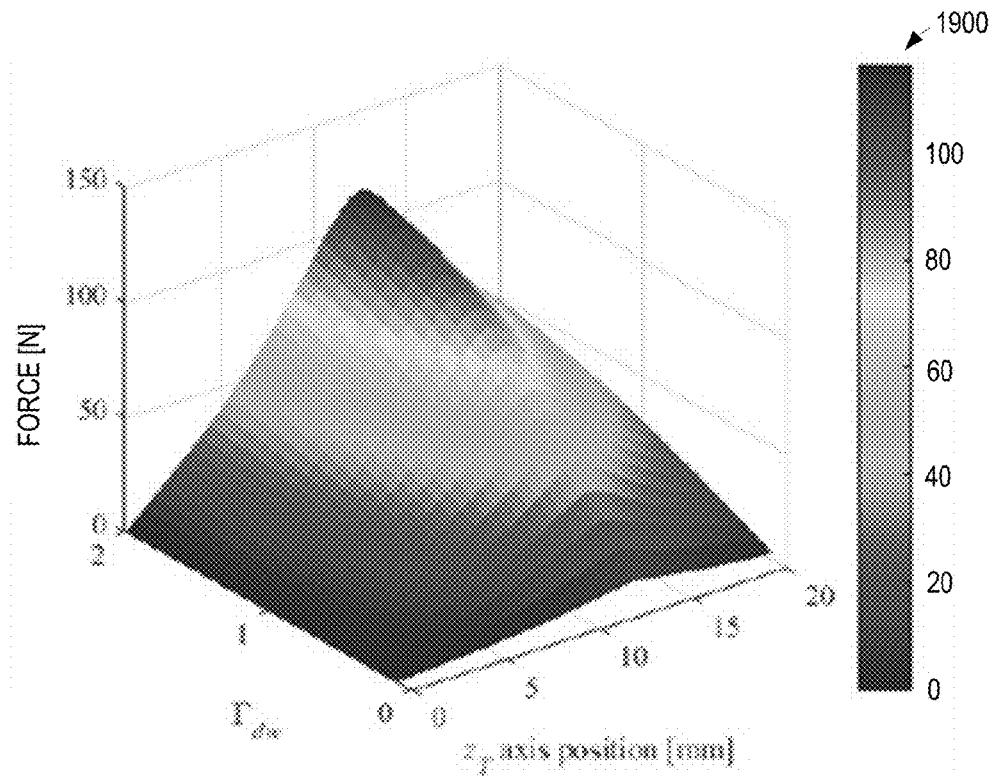
FIG. 19 shows an example plot of force as a function of depth-to-width ratio and translational displacement for an example magnetic spring.
Figure 20:
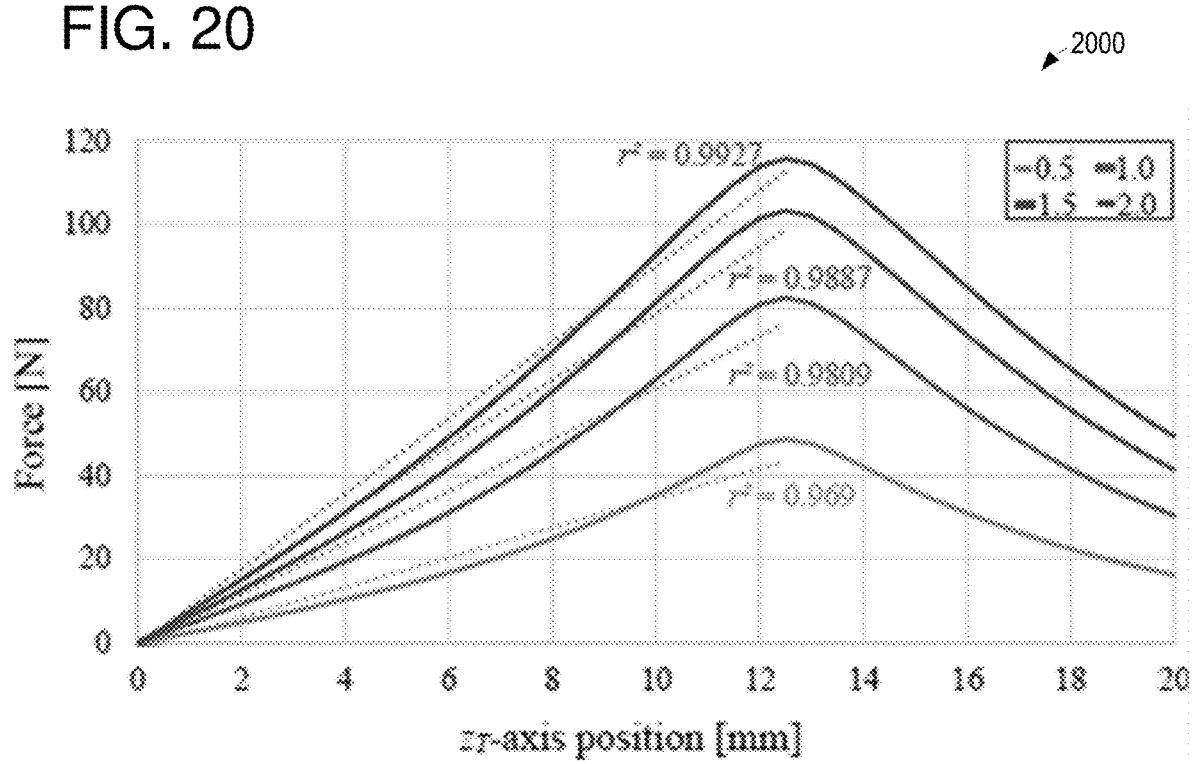
FIG. 20 shows an example plot of force versus displacement curves for different cuboidal depth ratios for an example magnetic spring.
Figure 21:
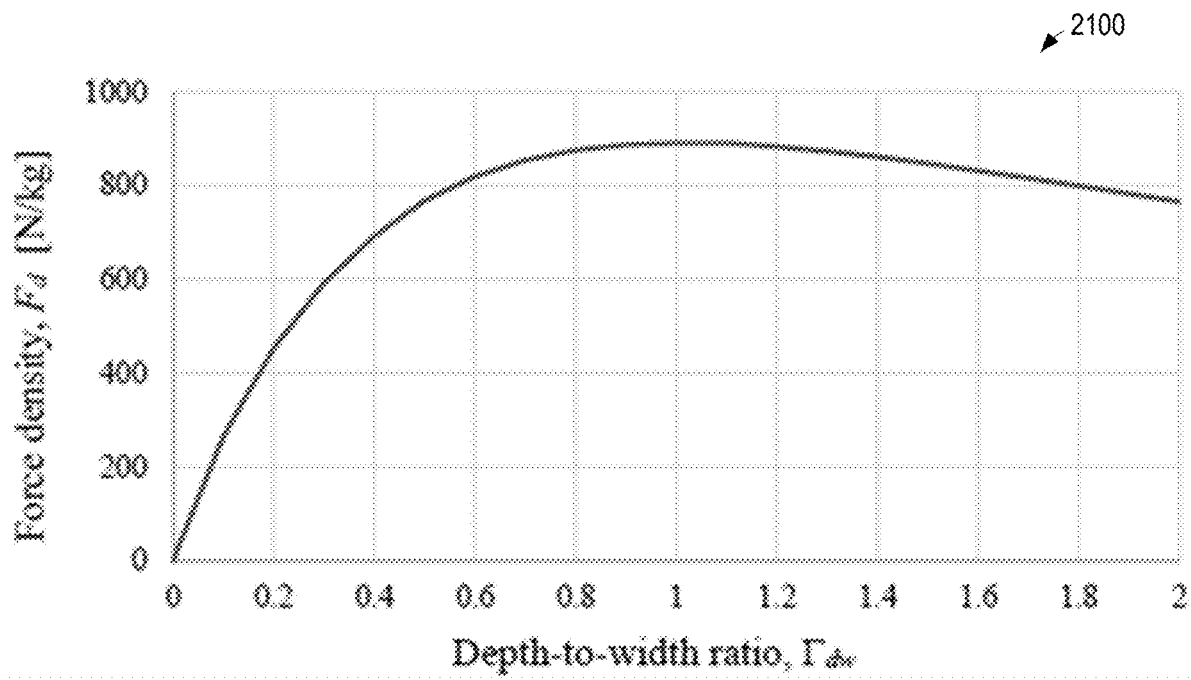
FIG. 21 shows an example plot of force density as a function of depth-to-width ratio at a zero position for an example magnetic spring.

A plot 1900 of the spring force as a function of $\Gamma_{dw}$ and $z_T$ is shown in FIG. 19 for the case when $(\Gamma_h, \Gamma_{hw}, z_{co})=(1, 2, 0)$ and the cylindrical tube magnet radius was kept fixed at $r_o=6.25$ mm (e.g., where $\theta_k=0°$ and $(z_{co}, h_c, h_r)=(0, 25, 25)$ mm). The linearity and force increase as $\Gamma_{dw}$ increases. FIG. 20 shows the calculated linearity $r^2$ value for four different cases. For example, plot 2000 of FIG. 20 shows force versus displacement curves for different cuboidal depth ratios, $\Gamma_{dw}$, and the $r^2$ correlation coefficient is also shown. FIG. 21 shows a plot 2100 of force density as a function of the depth-to-width ratio when $\theta_k=0°$ and $(z_{co}, h_c, h_r, r_o)=(0, 25, 25, 6.25)$ mm. As shown in plot 2100, the peak force density occurs at $\Gamma_{dw} \approx 1.0$ but by increasing $\Gamma_{dw}$ up to $\Gamma_{dw}=1.2$ a higher force can be obtained without a significant force density reduction. Therefore $\Gamma_{dw}=1.1$ may be selected.

The cylindrical tube and cuboidal magnet diameter-to-width ratio can be defined as $$\Gamma_{2rw} = \frac{2r_o}{w} \qquad (11)$$

Figure 22:
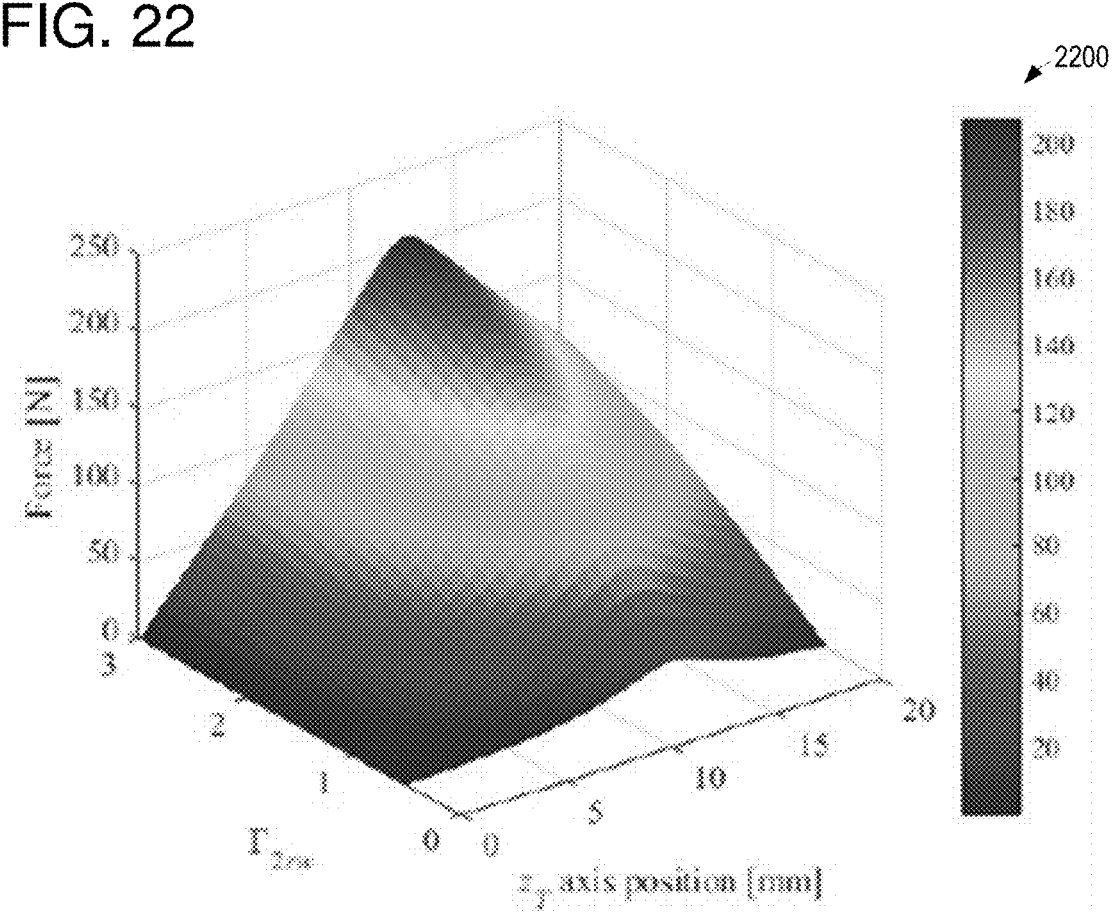
FIG. 22 shows an example plot of force as a function of cylindrical tube and cuboidal magnet diameter-to-width ratio and translational displacement for an example magnetic spring.
Figure 23:
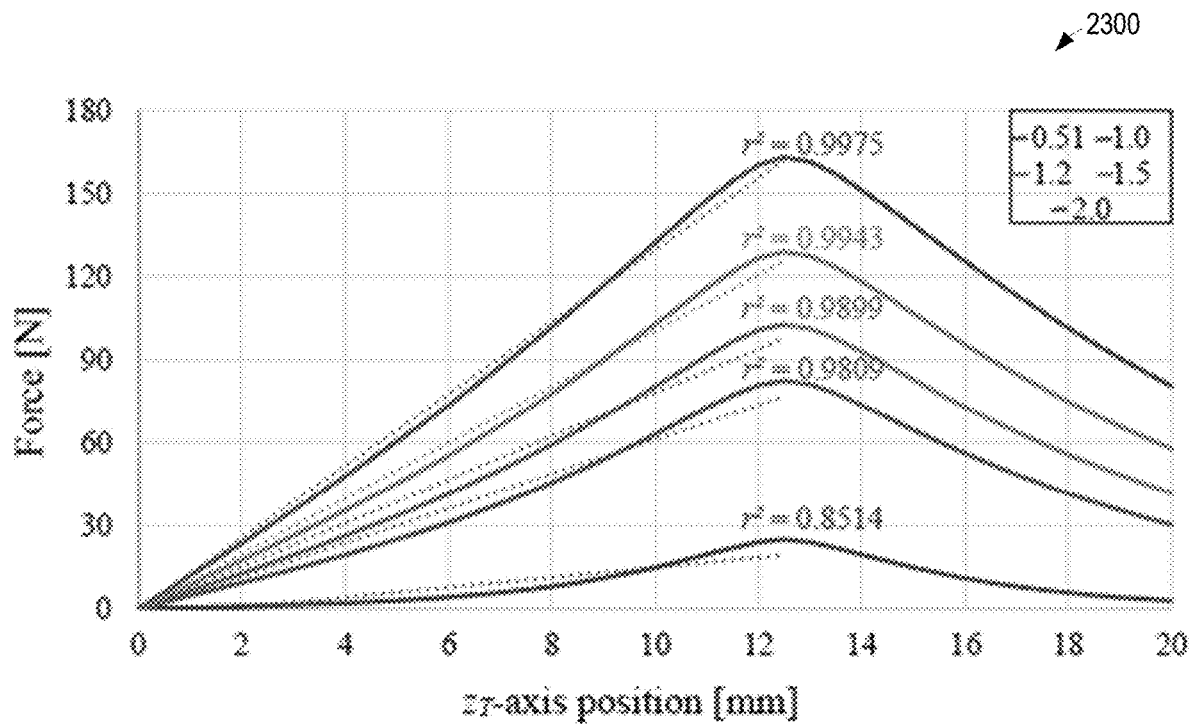
FIG. 23 shows an example plot of force versus displacement for different diameter-to-width ratios for an example magnetic spring.
Figure 24:
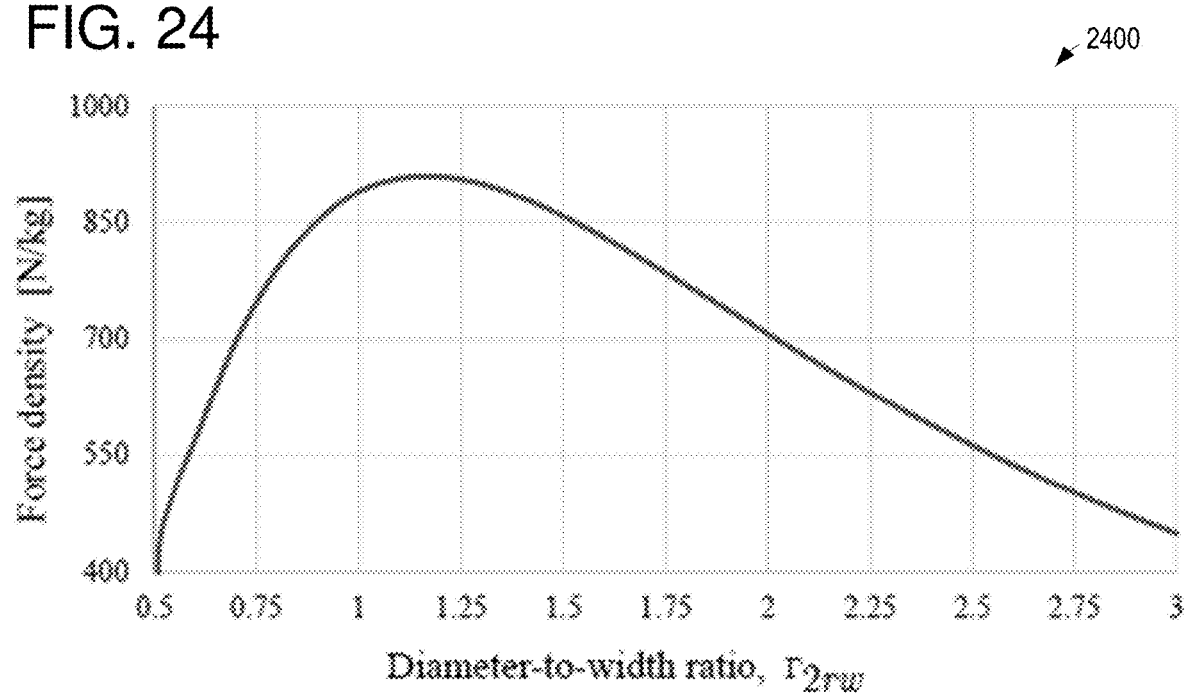
FIG. 24 shows an example plot of force density for different diameter-to-width ratios for an example magnetic spring.

Keeping $(\Gamma_h, \Gamma_{hw}, \Gamma_{dw}, z_{co})=(1, 2, 1.1, 0)$ a plot of the spring force as a function of $\Gamma_{2rw}$ and translational displacement $z_r$ is shown in plot 2200 of FIG. 22. FIG. 23 shows a plot 2300 of force versus displacement for different diameter-to-width ratios, and the $r^2$ coefficient is also shown. As $\Gamma_{2rw}$ increases the linearity improves, this is shown in FIG. 23 for five different ratio values, however the force density peaks at $$\Gamma_{2rw}=1.2, \qquad (12)$$

as shown in FIG. 24, which shows a plot 2400 of force density for different diameter-to-width ratios. Therefore, this value may be selected.

Figure 25:
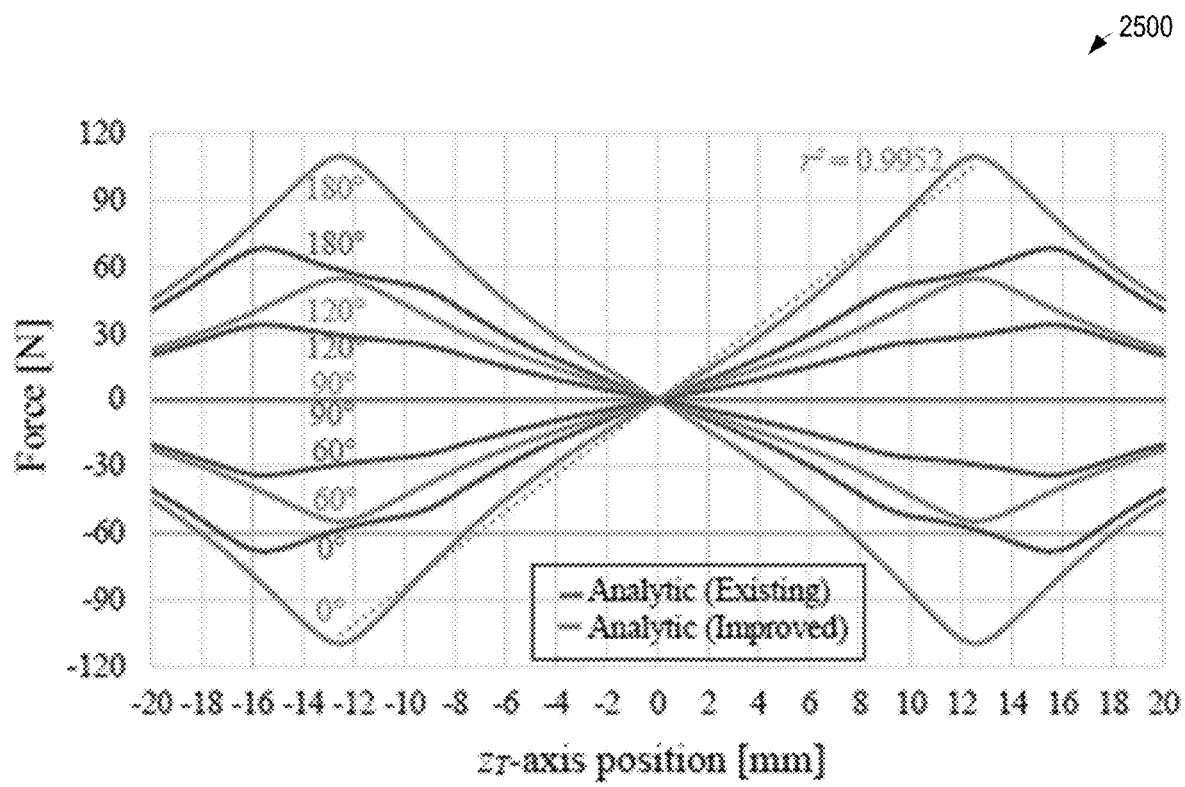
FIG. 25 shows an example plot of a force comparison at different angle adjustment values for example magnetic springs having different parameters.
Figure 26:
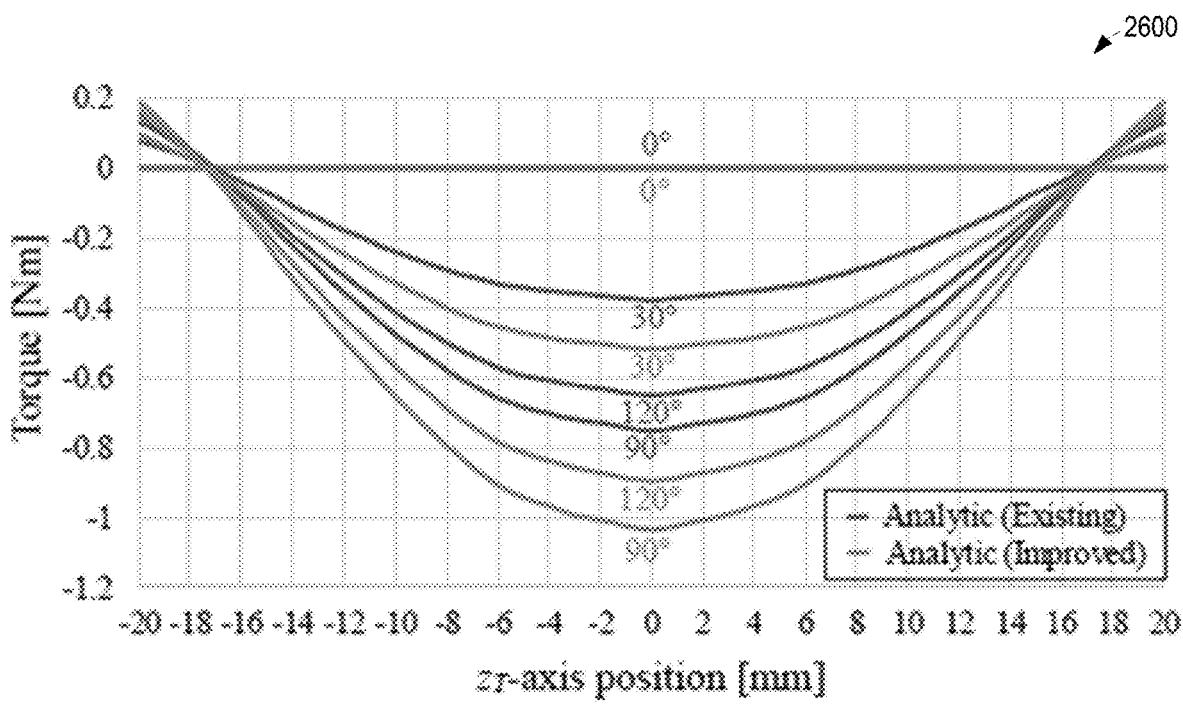
FIG. 26 shows an example plot of a torque comparison at different angle adjustment values for example magnetic springs having different parameters.
Figure 27:
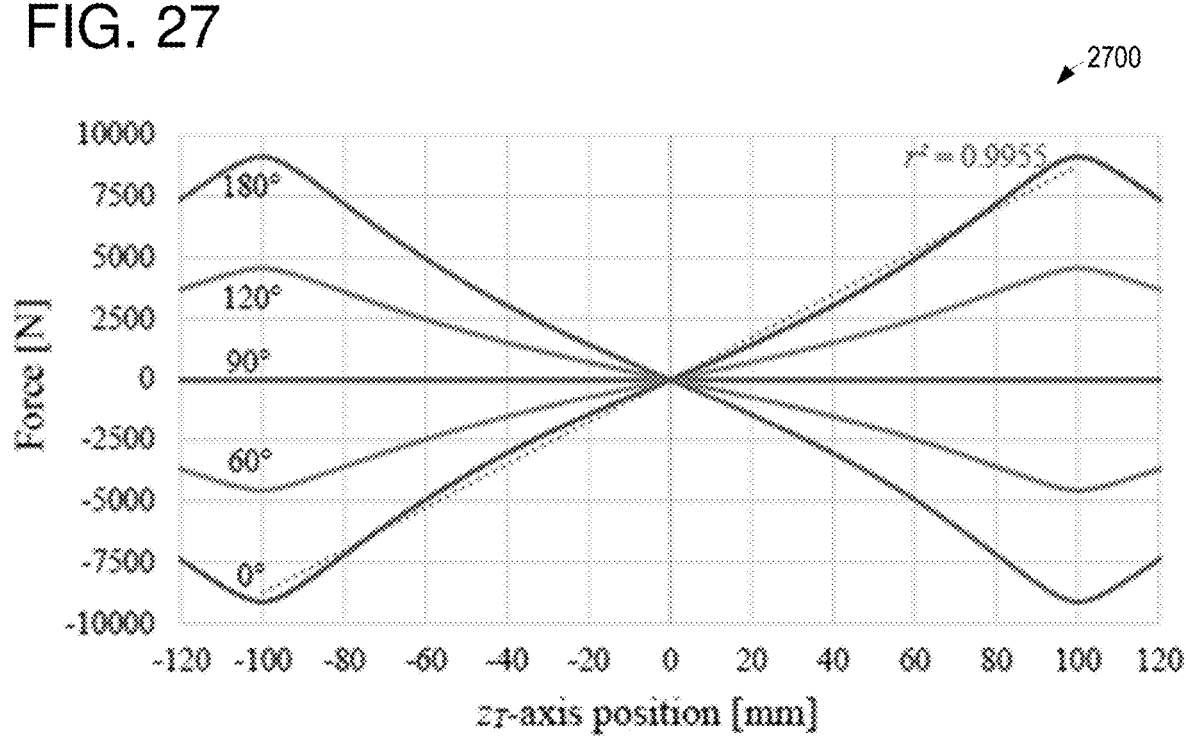
FIG. 27 shows an example plot of force as a function of stroke length and angular position for an example magnetic spring.

Based on the parameter sweep analysis the scaling ratios as stated in Table Ib below may be used. Using these ratios, the magnet parameters for a stroke length of 12.5 mm and 100 mm are given in Table II. Table III shows the performance parameters for the 12.5 mm stroke length configuration. Note that for the 100 mm stroke length the airgap was increased to g=2 mm. Using the parameters defined in Table II the force and torque as a function of axial position, $z_T$, was plotted for the 12.5 mm stroke length configuration. The comparison with the original configuration is shown FIGS. 25 and 26, and the improved linearity and peak force is evident. For example, FIG. 25 shows a plot 2500 of a force comparison at different angle adjustment values for the magnetic spring using the earlier-described proof-of-principle geometric values ("existing") and the parameters of table Ib ("improved"). FIG. 26 shows a plot 2600 of a torque comparison at different angle adjustment values for the magnet spring using the proof-of-principle geometric values ("existing") and the parameters of table Ib ("improved"). The force relationship for the 100 mm stroke length design is shown in FIG. 27, where it can be seen that a highly linear stroke length can be obtained. For example, FIG. 27 shows a plot 2700 of force as a function of stroke length and angular position, $\theta_k$, for a maximum stroke length of $z_m=100$ mm.

TABLE Ib

Selected Scaling Ratios

| Ratio | Equation | Value |
|---|---|---|
| Tube magnet separation | $z_{co}$ | 0 |
| Displacement ratio, $\Gamma_d$ | $2\max(z_T)/h_c$ | 1 |
| Height ratio, $\Gamma_h$ | $h_r/h_c$ | 1 |
| Height-to-width ratio, $\Gamma_{hw}$ | $h_r/w$ | 1 |
| Depth-to-width ratio, $\Gamma_{dw}$ | $d/w$ | 1.1 |
| Diameter-to-width ratio, $\Gamma_{2rw}$ | $2r_o/w$ | 1.2 |

TABLE II

Selected Parameter Values

| | | | Design Stroke length, $z_m$ [mm] | |
|---|---|---|---|---|
| Description | | Equation | 12.5 | 100 |
| Rectangular cuboidal magnet | Height, $h_r$ | $2 \cdot z_m$ | 25 | 200 |
| | Width, w | $w = h_r/2$ | 12.5 | 100 |
| | Depth, d | $d = 1.1w$ | 13.75 | 110 |
| Cylinder tube magnet | Height, $h_c$ | $h_c = h_r$ | 25 | 200 |
| | Outer radius, $r_o$ | $r_o = 1.2w/2$ | 7.5 | 60 |
| | Separation length, $z_{co}$ | 0 | 0 | 0 |
| | Air gap, g | — | 0.5 | 2 |

TABLE III

Performance Comparison

| Design Peak stroke length | Original 10 mm | Selected 12.5 mm | Units |
|---|---|---|---|
| Peak force | 52.3 | 109.5 | N |
| Peak torque | −0.74 | −1.0 | N · m |
| Peak energy | 0.51 | 1.27 | J |
| Peak stiffness | 5230 | 8760 | N/m |
| Active volume | 12.3 | 15.8 | cm³ |
| Force density | 564 (4230) | 922 (6918) | N/kg (kN/m³) |
| Torque density | 7.9 | 8.4 | N · m/kg |
| Energy density | 5.5 (41.264) | 10.7 (80.3) | J/kg (kJ/m³) |

The energy can be determined for the magnetic springs by computing the work performed by travelling along the stroke length. The work is computed using $$W(\theta_k) = \int_0^{z_m} F_s(z_T, \theta_k) dz_T \quad (13)$$

Figure 28:
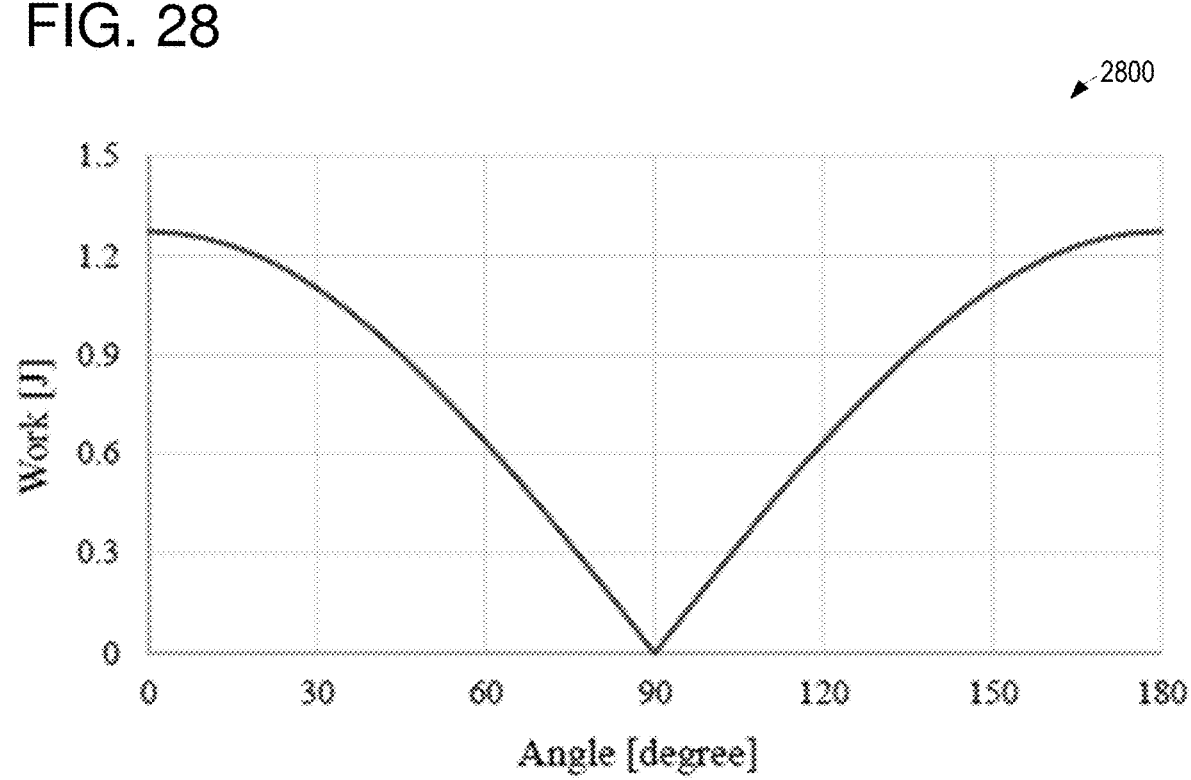
FIG. 28 shows an example simulation result for work done for different angular positions of an example magnetic spring.

For instance, for the 12.5 mm stroke length design, the work done for different angular positions, $\theta_k$, was computed, the simulation result is shown in plot 2800 of FIG. 28; the work is a cosinusoidal function. The volumetric energy density can be computed from $$E_{dv} = \frac{W(0)}{2wdh_r + 2\pi(r_o^2 - r_i^2)h_c} \quad (14)$$

Evaluating (14) gives a peak active region energy density of 80.3 kJ/m³ (10.7 J/kg) for the 12.5 mm stroke length and 95.4 kJ/m³ (12.7 J/kg) for the 100 mm stroke length design.

The force as a function of stroke length for the 12.5 mm recommended design is highly linear and can be accurately described by $$F_T(z_t, \theta_k) = [F_m \cos(\theta_k)]z, \quad (15)$$

where $F_m$=8.7664 N/mm is the peak spring force. The stiffness is defined by the term within the square brackets in (15). When the magnet has a negative stiffness, the spring is in an unstable position. The torque needed to create the desired stiffness values is accurately described by $$T_Z(z_t, \theta_k) = -T_m \sin(\theta_k)\cos(kz_t) \quad (16)$$

where k=π/34 and $T_m$=1.0 N·m peak torque.

Figure 29:
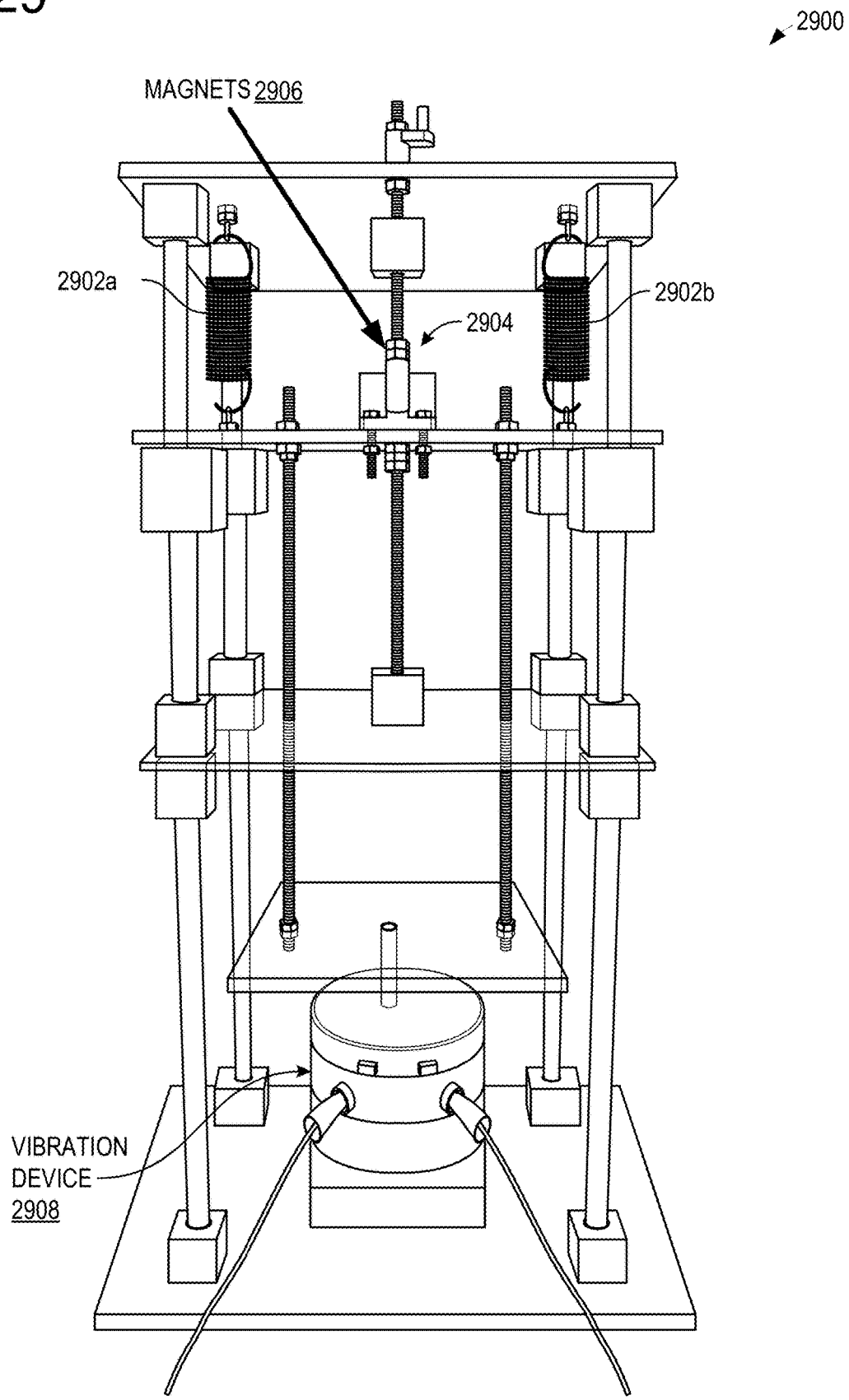
FIG. 29 shows an example proof-of-principle prototype of an adjustable magnetic spring.
Figure 30:
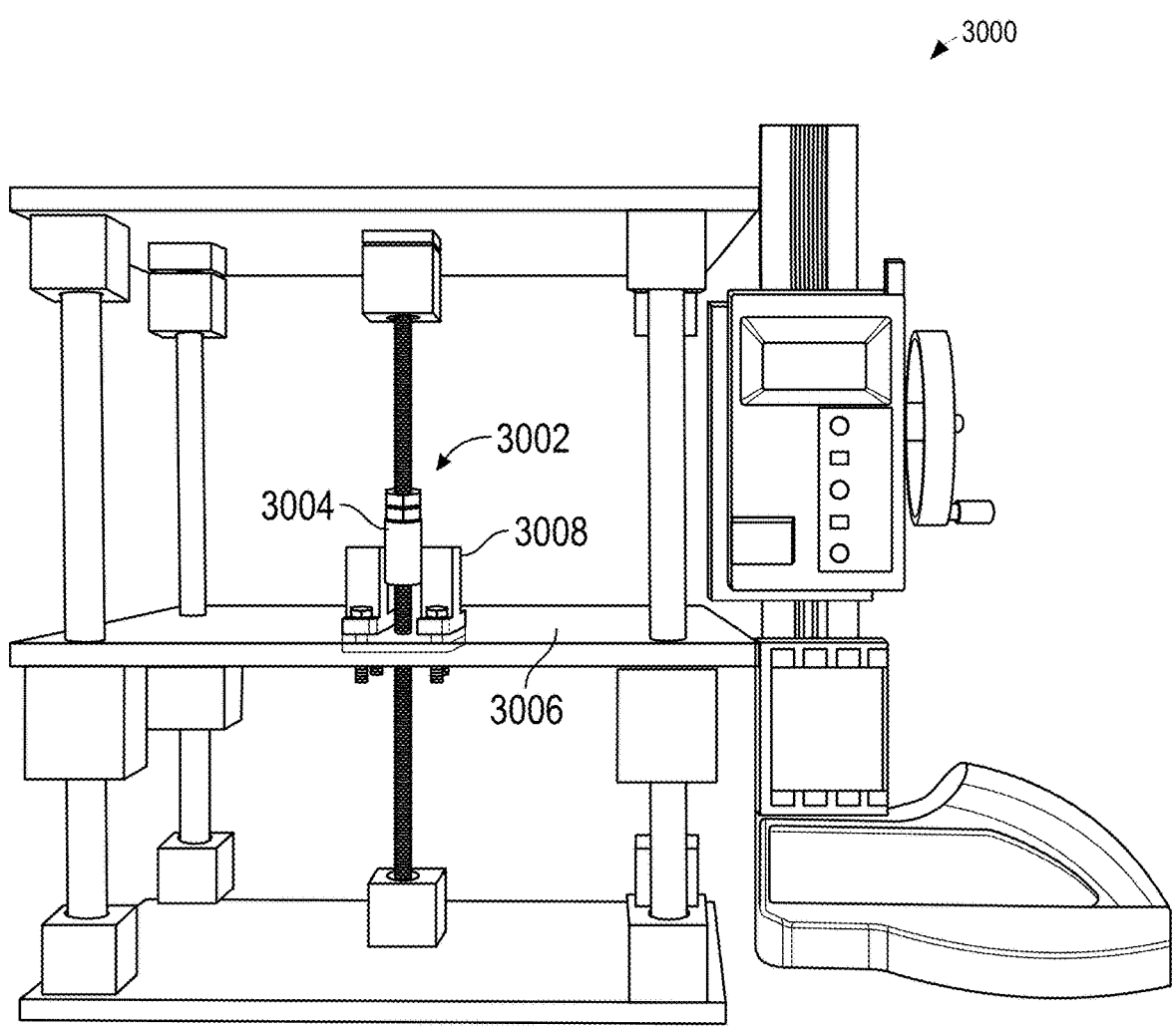
FIG. 30 shows another example prototype of an adjustable magnetic spring.

A proof-of-principle experimental prototype 2900 of the adjustable magnetic spring is described herein. The experimental prototype is shown in FIG. 29. Two mechanical springs 2902a and 2902b have been put in parallel with an adjustable magnetic spring 2904 including magnets 2906 (e.g., which may include any of the example magnetic springs described herein) and so when the magnetic spring stiffness is made negative the total spring stiffness is significantly lowered. This then enables the resonance capability of the device to be studied when different low frequency forcing input are applied. The same magnet dimensions as given in Table Ia and/or Table Ib may be used in the prototype 2900. A vibration device 2908 may be used to effect displacement of the magnetic spring 2904 (and mechanical springs 2902a and 2902b). FIG. 30 shows another example prototype 3000 including an adjustable magnetic spring 3002, which may include any of the example magnetic springs described herein. In the illustrated example, the central magnet 3004 is fixed and, by applying force on the middle plate 3006, the side magnets 3008 translate in a direction of the force applied on the plate 3006.

Figure 31:
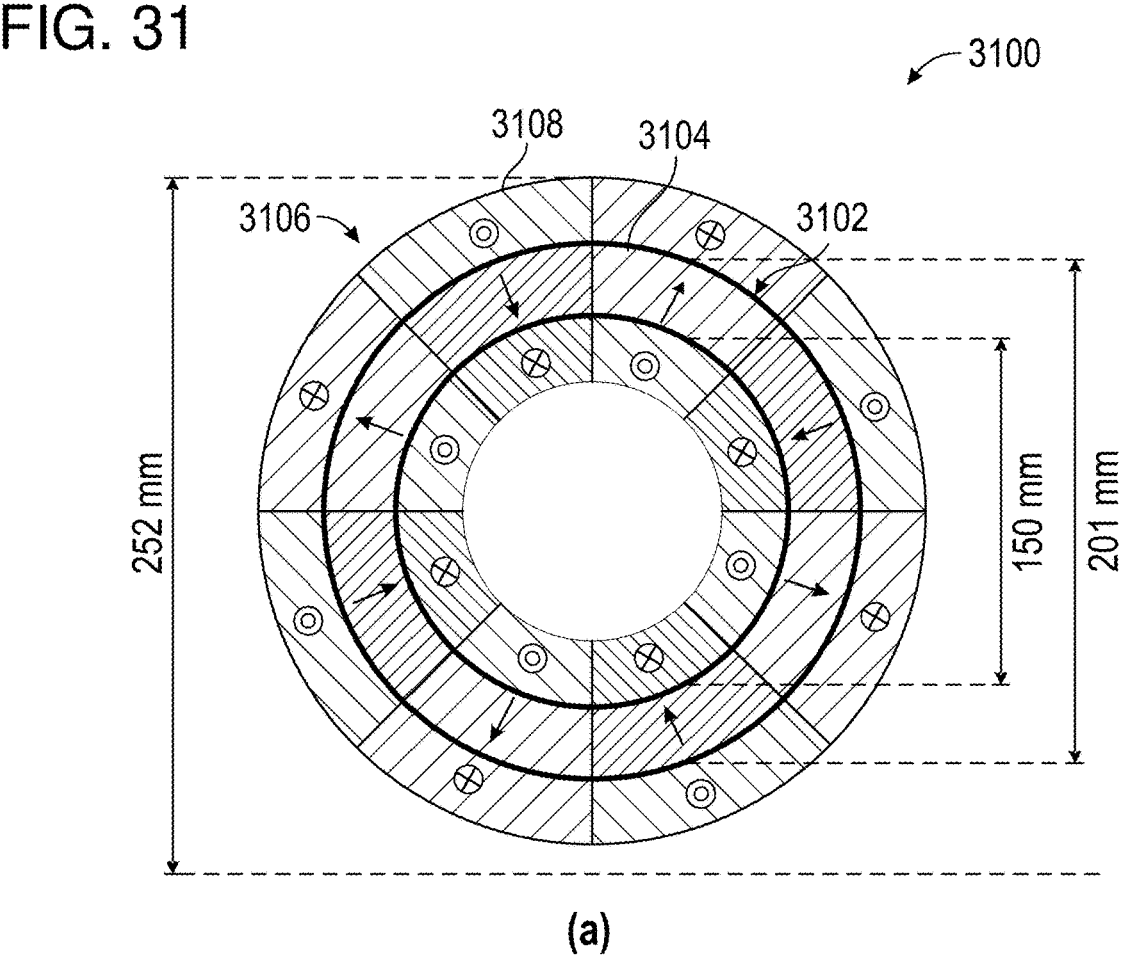
FIG. 31 shows an example adjustable magnetic spring configuration using multi-pole magnets.
Figure 31:
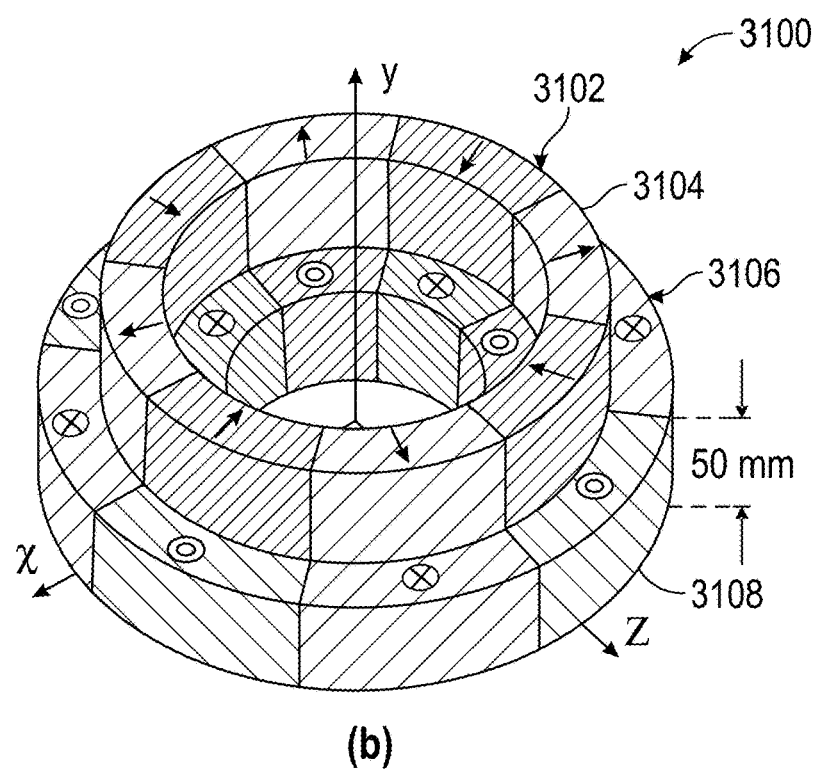

An example of another AMS configuration, with 8 poles, is shown in FIG. 31, with a top view of an AMS 3100 shown at (a) and an isometric side view of the AMS 3100 shown at (b). It is to be understood that the dimensions shown in FIG. 31 are exemplary, and any suitable dimensions may be used without departing from the scope of this disclosure. As shown, the AMS 3100 is composed of different rings of magnets, where adjacent magnets of each ring have opposing directions of polarity from one another. For example, AMS 3100 includes a first ring 3102 including eight magnets 3104 and a second ring 3106 including eight magnets 3108. It is to be understood that in further examples, the AMS may also include a third ring positioned below the second ring 3106 (e.g., such that the second ring is positioned between the first ring 3102 and the third ring, and the first and third rings are aligned with one another and/or all of the first, second, and third rings are aligned with one another along a central, y, axis). The third ring may be configured to be the same as the first ring (e.g., sized the same, with the same number of magnets) and may have an opposite polarity as the first ring (e.g., where the polarity of a magnet of the first ring is opposite of the polarity of a corresponding magnet of the third ring, and where corresponding magnets of the first and third ring are defined as being aligned along the y axis). As described with respect to earlier examples of adjustable magnetic springs, the rings may be movable rotationally and translationally relative to one another, whereby the rotational movement effects a change in stiffness of the spring and the translational movement corresponds to a displacement of the spring and causes the spring to exert a force based on the amount and direction of the displacement and the stiffness of the spring.

Figure 32:
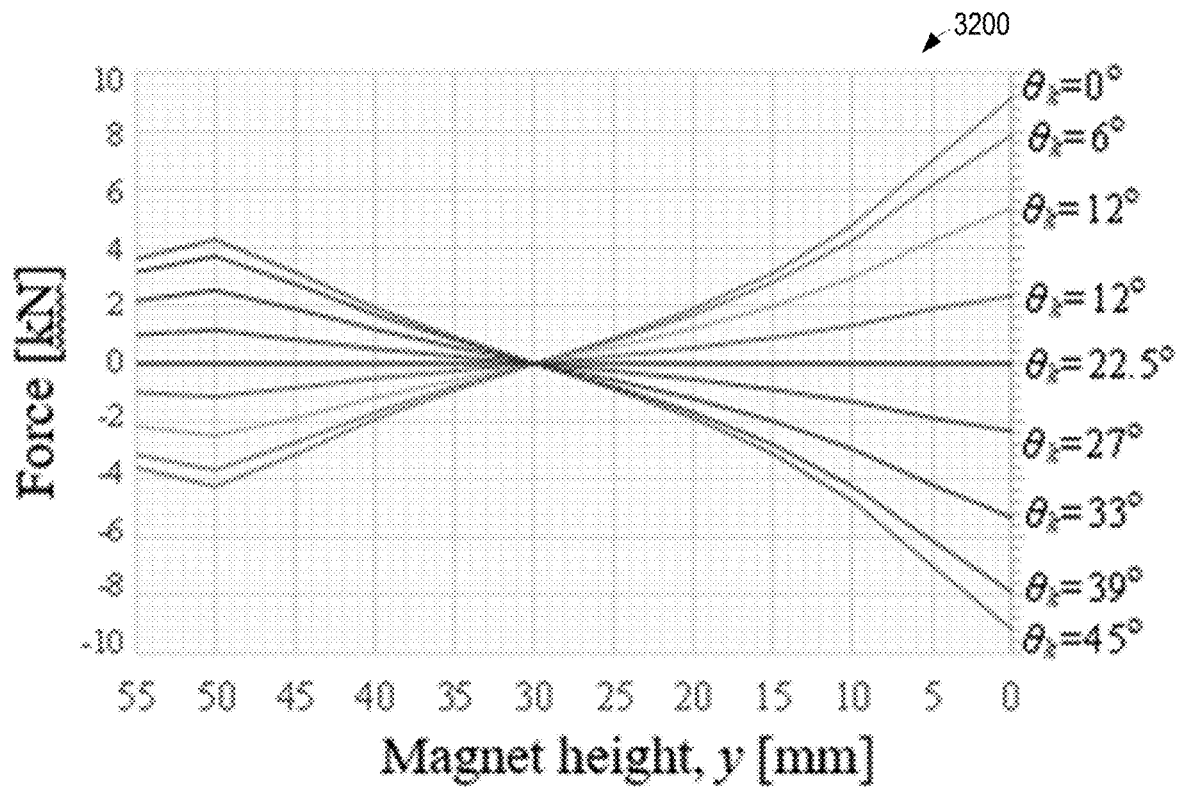
FIG. 32 shows an example plot of force relationships for the multi-pole adjustable magnetic spring of FIG. 31.
Figure 33:
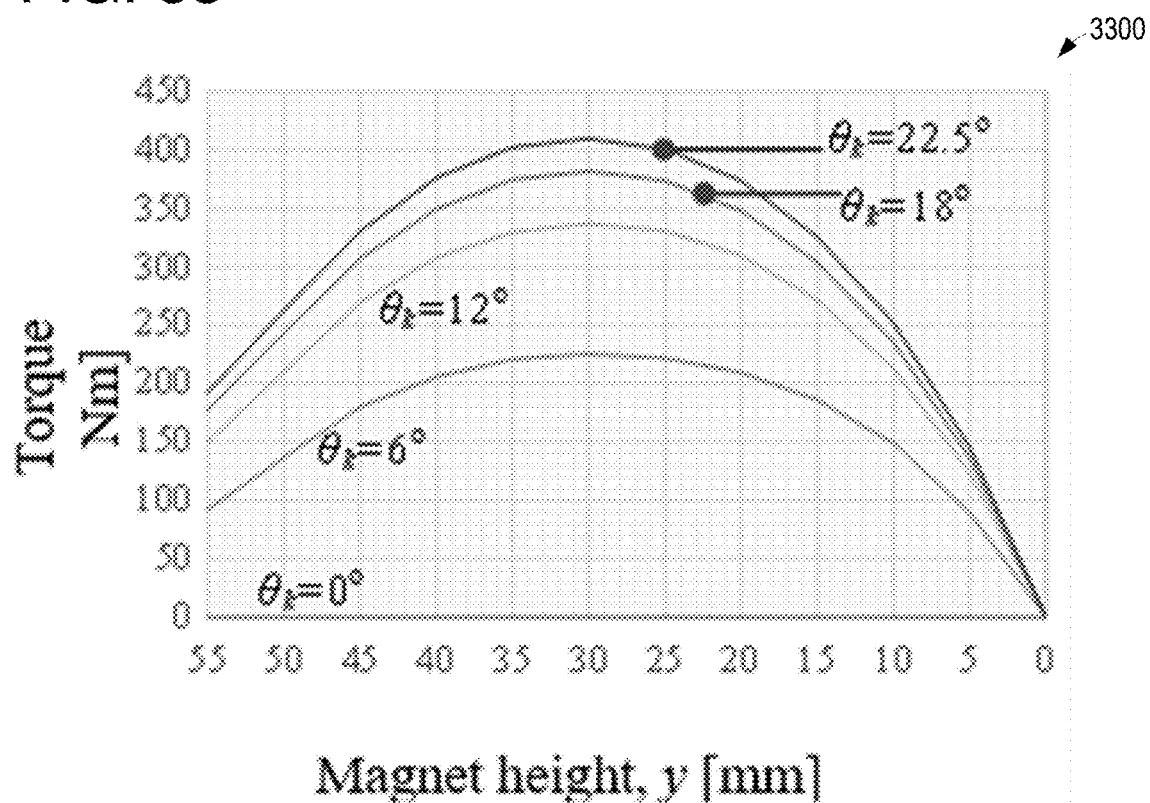
FIG. 33 shows an example plot of torque relationships for the multi-pole adjustable magnetic spring of FIG. 31.

The force and torque relationship between the translation and rotation of the AMS 3100 is shown in FIGS. 32 and 33, respectively. The operation of the AMS is not the same as an actuator, there is no fixed torque-force ratio, instead the energy is transferred back-and-forth between angular and translational energy. FIGS. 32 and 33 show the 3-D finite element analysis (FEA) calculated result for the AMS configuration shown in FIG. 31. For example, FIG. 32 shows a plot 3200 of force relationships for the multi-pole AMS 3100 of FIG. 31 as a function of magnet height and rotor angle. FIG. 33 shows a plot 3300 of torque relationships for the multi-pole AMS 3100 of FIG. 31 as a function of magnet height and rotor angle. In this example the translational force is maximum when fully enclosed in the outer and inner magnets and is zero when at y=30 mm (rest position). However, FIG. 33 shows that torque is maximized at the zero force position when the rotor angle is $\theta_k$=22.5°=360°/(2×pole). Unlike a mechanical or pneumatic spring, the AMS could have a long design life. While the force density of the AMS is not as high as a pneumatic spring, the AMS can be made to have a negative spring constant within the same housing structure.

Figure 34:
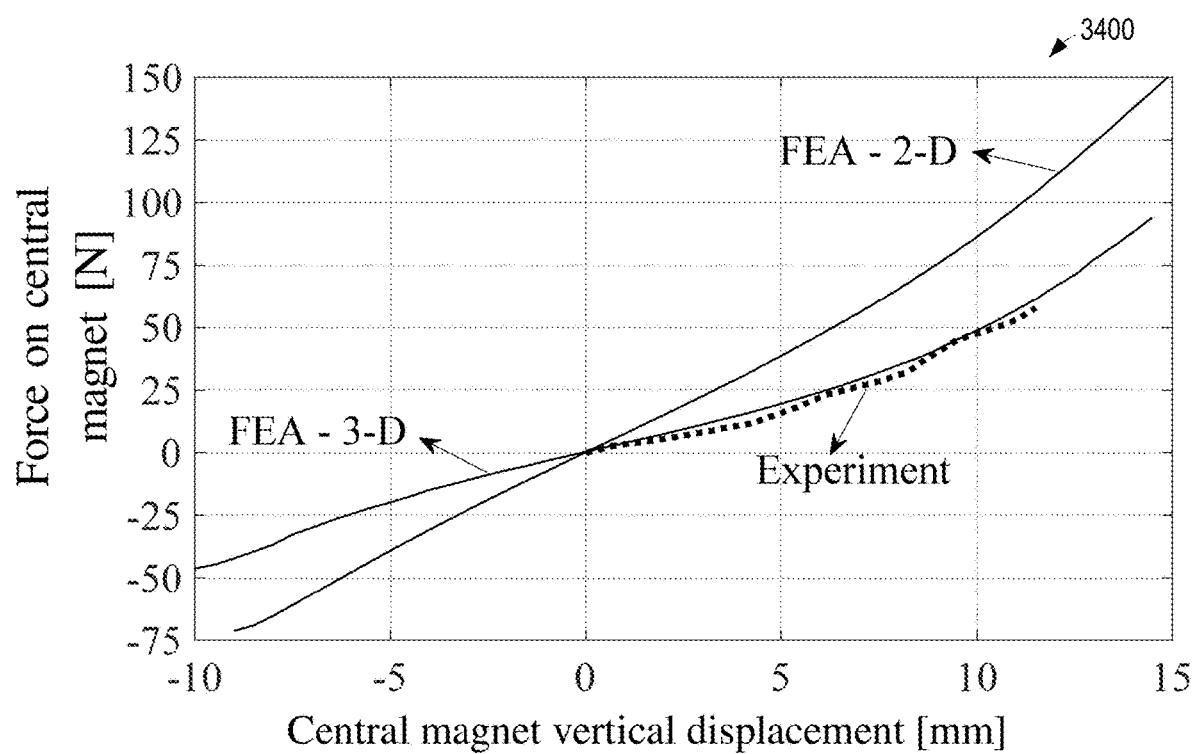
FIG. 34 shows an example plot of force on a central magnet versus resulting central magnet vertical displacement for an example magnetic spring.
Figure 35:
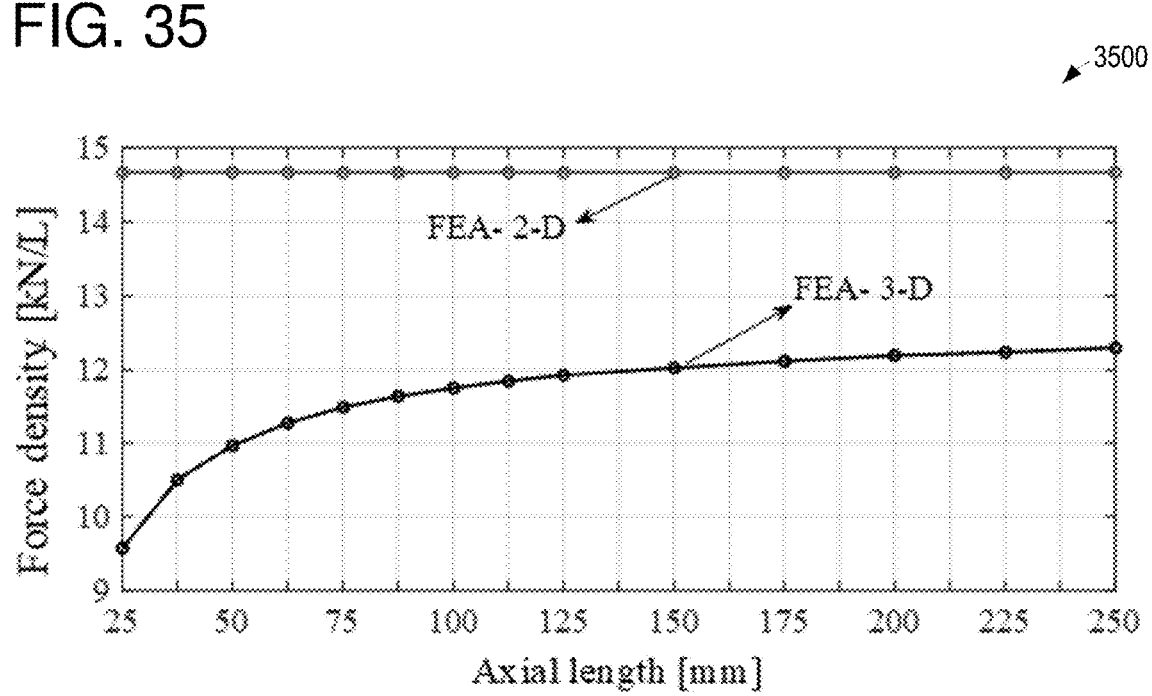
FIG. 35 shows an example plot of force density versus axial length of a magnetic gear using two-dimensional and three-dimensional models.

FIG. 34 shows an example plot 3400 of force on a central magnet versus resulting central magnet vertical displacement relating to an experimental validation of an adjustable stiffness spring according to one of the example configurations of the disclosure. Plot 3400 shows that the experimental results generally match a three-dimensional FEA result and that two-dimensional analysis does not represent the real-world behavior of the magnetic spring, as the two-dimensional analysis neglects the three-dimensional edge effect. FIG. 35 shows an example plot 3500 of force density versus axial length of a magnetic gear using two-dimensional and three-dimensional models. The two-dimensional analysis is indifferent to the axial length, and is thus more straightforward to derive and faster to apply. While the three-dimensional analysis arrives closer to the two-dimensional analysis at larger axial lengths, there is still a difference.

Figure 36:
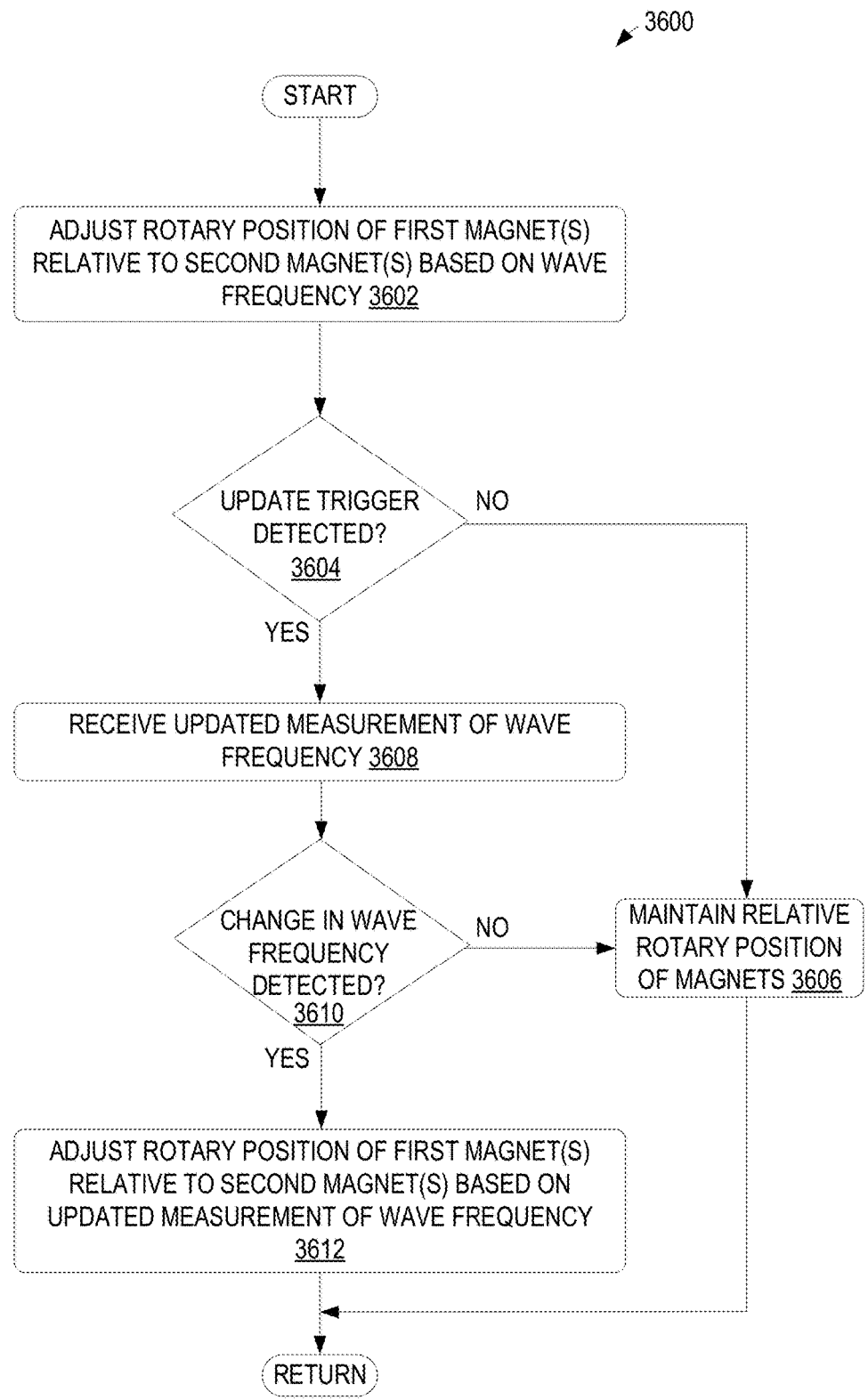
FIG. 36 is a flow chart of an example method of adjusting a stiffness of an adjustable magnetic spring.

As described above, the adjustable stiffness magnetic spring examples described herein may be used in a variety of applications. FIG. 36 is a flow chart of an example method 3600 for controlling the stiffness of a magnetic spring (e.g., any of the example magnetic springs described herein) in a wave energy converter (WEC). At 3602, the method includes adjusting a rotary position of one or more first magnets relative to one or more second magnets based on a wave frequency. For example, the rotary position of the magnet(s) may be adjusted to create a negative spring constant to allow the WEC to operate at resonance with the wave frequency, as described above with respect to equation (1).

At 3604, the method includes determining if an update trigger is detected. The update trigger may be a trigger for a regular update of a measurement of wave frequency (e.g., once a minute, once an hour, once a day, etc.), a trigger based on a detected event (e.g., a weather event that indicates a likely change in wave activity, a detection of a disturbance to the water, such as increased boat traffic, that may affect wave activity, etc.), a user request, and/or any other suitable trigger. If no update trigger is detected (e.g., "NO" at 3604), the method proceeds to 3606 and includes maintaining a relative rotary position of magnets. If an update trigger is detected (e.g., "YES" at 3604), the method proceeds to 3608 and includes receiving an updated measurement of wave frequency. The updated measurement of wave frequency may be captured locally at the WEC and/or provided by a remote wave frequency detection or estimation device in some examples.

At 3610, the method includes determining if a change in wave frequency is detected. For example, the change in frequency may be detected if the updated measurement is more than a threshold amount larger or smaller than the wave frequency used to set the rotary position of the magnet(s) at 3602. If a change in wave frequency is not detected (e.g., "NO" at 3610), the method proceeds to 3606 and includes maintaining the relative rotary position of the magnets. If a change in wave frequency is detected (e.g., "YES" at 3610), the method proceeds to 3612 and includes adjusting a rotary position of the first magnet(s) relative to the second magnet(s) based on the updated measurement of wave frequency. Adjusting the rotary position may include using a motor to move the magnet and applying a brake to hold the magnet in a desired position. In examples where two rotatable magnets are included in the spring (e.g., two cylindrical magnets positioned or extending above two rectangular cuboidal magnets, two rings of magnets positioned respectively above and below a central ring of magnets, etc.), the magnets may be rotated in coordination with one another to maintain opposite polarity in the two rotatable magnets in some examples. After adjusting the rotary position of the magnets at 3612 or maintaining the rotary position of the magnets at 3606, the method may return to continue monitoring for update triggers (e.g., return to 3604) and/or return to another state of operation.

The example operation of method 3600 may be useful in applications, such as wave energy conversion, where changing the stiffness of the magnetic spring expends some of the energy that is being converted/collected and thus reduces the efficiency of energy conversion. By only adjusting the stiffness under some conditions, less energy may be expended relative to a continuous adjustment scenario. For example, the update trigger or the threshold used to evaluate whether a substantive change in wave frequency is detected may be configured to maximize energy conversion efficiency based on the expected efficiency gain of the adjustment considering the energy usage to perform the adjustment. In other example applications, such as robotic actuation, the stiffness may be continuously adjusted based on dynamic conditions in order to provide an increased responsiveness of the spring (e.g., a reduction in delay between a requested actuation or detected condition and an associated affected actuation).

The disclosure presents the scaling analysis for a new type of variable stiffness magnetic spring. The magnetic spring was shown to exhibit a highly linear stroke length with an adjustable spring constant. Both positive and negative spring stiffness values can be obtained. An analytic-based magnetic charge modelling approach was utilized to conduct the sizing analysis and a recommended set of sizing equations for the presented adjustable magnetic spring was presented.

The ability to have an adjustable magnetic spring capable of positive and negative spring rates, as well as constant pre-load, at the high forces and large strokes needed by a WEC could be game changing. The use of an AMS will completely remove the stiffness loading demand on the generator. This should then increase efficiency while reducing the overall size and peak to average power requirements of the WEC device.

In view of the many possible embodiments to which the principles of the disclosed invention may be applied, it should be recognized that the illustrated embodiments are only preferred examples of the invention and should not be taken as limiting the scope of the invention.

I claim:

1. A variable stiffness magnetic spring comprising:
   a first plurality of magnets arranged in a first ring;
   a second plurality of magnets arranged in a second ring; and
   a third plurality of magnets arranged in a third ring, wherein:
   the first ring is rotatable relative to the second ring,
   the first ring is positioned between the second ring and the third ring along an axis of rotation of the first ring, and
   the first ring is translatable relative to the second ring or the second ring is translatable relative to the first ring.

2. The variable stiffness magnetic spring of claim 1, wherein the polarity of the third ring is opposite to the polarity of the second ring.

3. The variable stiffness magnetic spring of claim 1, wherein the second ring and the third ring include a same number of magnets as one another.

4. The variable stiffness magnetic spring of claim 1, wherein adjacent magnets of the first plurality of magnets in the first ring have polarities in opposing directions to one another.

5. The variable stiffness magnetic spring of claim 4, wherein adjacent magnets of the second plurality of magnets in the second ring have polarities in opposing directions to one another.

6. The variable stiffness magnetic spring of claim 5, wherein adjacent magnets of the third plurality of magnets in the third ring have polarities in opposing directions to one another.

7. The variable stiffness magnetic spring of claim 1, wherein the first ring is rotatable relative to the second ring using a motor configured to adjust a rotary position of the first ring relative to the second ring based on detection of an update trigger.

8. The variable stiffness magnetic spring of claim 7, wherein the variable stiffness magnetic spring is included in a wave energy converter, and wherein the motor is configured to adjust the rotary position of the first ring relative to the second ring based on an update of a measurement of wave frequency.

9. A variable stiffness magnetic spring system comprising:
   a rectangular cuboidal magnet pair comprising a first magnet and a second magnet configured to move translationally along a longitudinal axis of the magnetic spring in coordination with one another, the first magnet having an opposing polarity to the second magnet; and
   a third, cylindrical magnet rotatable circumferentially around the longitudinal axis of the magnetic spring relative to the rectangular cuboidal magnet pair to adjust a stiffness of the magnetic spring.

10. The variable stiffness magnetic spring system of claim 9, further comprising a controller configured to control an adjustment mechanism to rotate the third magnet around the longitudinal axis of the magnetic spring relative to the rectangular cuboidal magnet pair.

11. The variable stiffness magnetic spring system of claim 10, wherein the magnetic spring is included in a wave energy converter, and wherein the controller is configured to control the adjustment mechanism to rotate the third magnet to a degree relative to the rectangular cuboidal magnet pair that is a function of wave motion of waves impinging upon the wave energy converter.

12. The variable stiffness magnetic spring system of claim 9, wherein the third, cylindrical magnet comprises a plurality of magnets arranged in a ring.

13. The variable stiffness magnetic spring system of claim 12, wherein adjacent magnets in the ring have polarities in opposing directions to one another.

14. A method of adjusting a stiffness of a magnetic spring comprising:
   adjusting a rotary position of a first magnet relative to a second magnet;
   detecting, by a controller, an update trigger based on a detected event;
   receiving, by the controller, an updated condition; and
   adjusting the rotary position of the first magnet relative to the second magnet to a selected relative position based on the updated condition.

15. The method of claim 14, wherein the first magnet is translatable relative to the second magnet, or the second magnet is translatable relative to the first magnet.

16. The method of claim 14, wherein the magnetic spring is included in a wave energy converter and wherein the updated condition includes a wave frequency.

17. The method of claim 14, wherein the polarity of the first magnet is orthogonal to the polarity of the second magnet, wherein the magnetic spring further comprises a third magnet, and wherein the adjusting the rotary position of the first magnet relative to the second magnet further comprises rotating the second magnet and the third magnet in coordination with one another to maintain opposite polarity in the second magnet and the third magnet relative to one another.

18. The method of claim 14, wherein the first magnet comprises a rectangular cuboidal magnet pair including a first rectangular magnet and a second rectangular magnet, wherein the second magnet comprises a cylindrical magnet, and wherein adjusting the rotary position of the first magnet relative to the second magnet comprises circumferentially rotating the cylindrical magnet around a longitudinal axis of the magnetic spring relative to the rectangular cuboidal magnet pair.

19. The method of claim 14, wherein the first magnet comprises a first cylindrical multi-pole magnet configured to move translationally along a longitudinal axis of the magnetic spring, wherein the second magnet comprises a second cylindrical multi-pole magnet, and wherein adjusting the rotary position of the first magnet relative to the second magnet comprises rotating the second cylindrical multi-pole magnet around the longitudinal axis of the magnetic spring relative to the first cylindrical multi-pole magnet.

20. The method of claim 19, wherein adjusting the rotary position of the first magnet relative to the second magnet comprises rotating the second magnet to an initial rotor angle, $\theta k$ that is defined as $$\theta k = 360/(2*n),$$

where n is the number of poles of the second cylindrical multi-pole magnet.

* * * * *